United States Patent [19]
Parker et al.

[11] 3,966,890
[45] June 29, 1976

[54] METHOD OF PRODUCING SOLUTIONS CONTAINING CUPROUS IONS

[75] Inventors: Alan James Parker; Winfield Earle Waghorne, both of Canberra; Dion Ewing Giles, Sydney; John Howard Sharp, Sydney; Robert Alexander; David Michael Muir, both of Canberra, all of Australia

[73] Assignee: Anumin Pty. Limited, Canberra, Australia

[22] Filed: Dec. 17, 1974

[21] Appl. No.: 533,660

[30] Foreign Application Priority Data

| April 2, 1971 | Australia | 4500/71 |
| April 2, 1971 | Australia | 4501/71 |
| April 2, 1971 | Australia | 4502/71 |
| April 28, 1971 | Australia | 4735/71 |
| June 4, 1971 | Australia | 5110/71 |
| Sept. 14, 1971 | Australia | 6281/71 |
| Sept. 24, 1971 | Australia | 6411/71 |
| Oct. 20, 1971 | Australia | 6718/71 |
| Oct. 26, 1971 | Australia | 6798/71 |
| Dec. 14, 1971 | Australia | 7383/71 |
| Jan. 26, 1972 | Australia | 7776/72 |

Related U.S. Application Data

[62] Division of Ser. No. 237,061, March 22, 1972.

[52] U.S. Cl. ............ 423/512 A; 423/519; 423/557; 523/41; 423/27; 423/90; 204/86; 204/92; 204/93; 204/106; 203/57; 203/58; 203/33; 203/34; 203/35; 75/.5 A; 75/108; 75/117; 75/118 R; 75/109; 75/101 R

[51] Int. Cl.² .............. C01G 3/10; C22B 15/00; C22B 15/08

[58] Field of Search .......... 423/23, 27, 29, 41, 423/45, 512 A, 519, 557; 75/.5 A, 108, 117

[56] References Cited
UNITED STATES PATENTS

| 3,353,950 | 11/1967 | Junghauss | 75/117 |
| 3,502,551 | 3/1970 | Todt et al. | 175/119 |

FOREIGN PATENTS OR APPLICATIONS

| 681,882 | 10/1966 | Belgium | 204/106 |
| 575,812 | 5/1959 | Canada | 204/106 |
| 1,180,140 | 10/1964 | Germany | 204/106 |

OTHER PUBLICATIONS

Technique of Inorg. Chem., vol. 1, John Wiley, N.Y. 1963, p. 42.

*Primary Examiner*—Herbert T. Carter
*Attorney, Agent, or Firm*—Fleit & Jacobson

[57] ABSTRACT

Methods of reducing aqueous solutions of cupric sulfate to cuprous solutions by using organic nitrile compositions are disclosed. The particular nitrile used is acetonitrile and the reductant is sulphur dioxide. The method has application commercially to leaching ores containing oxidised copper to obtain cuprous ion solutions. Such solutions can be treated by electrochemical or thermal disproportionation methods to obtain very pure copper.

3 Claims, 7 Drawing Figures

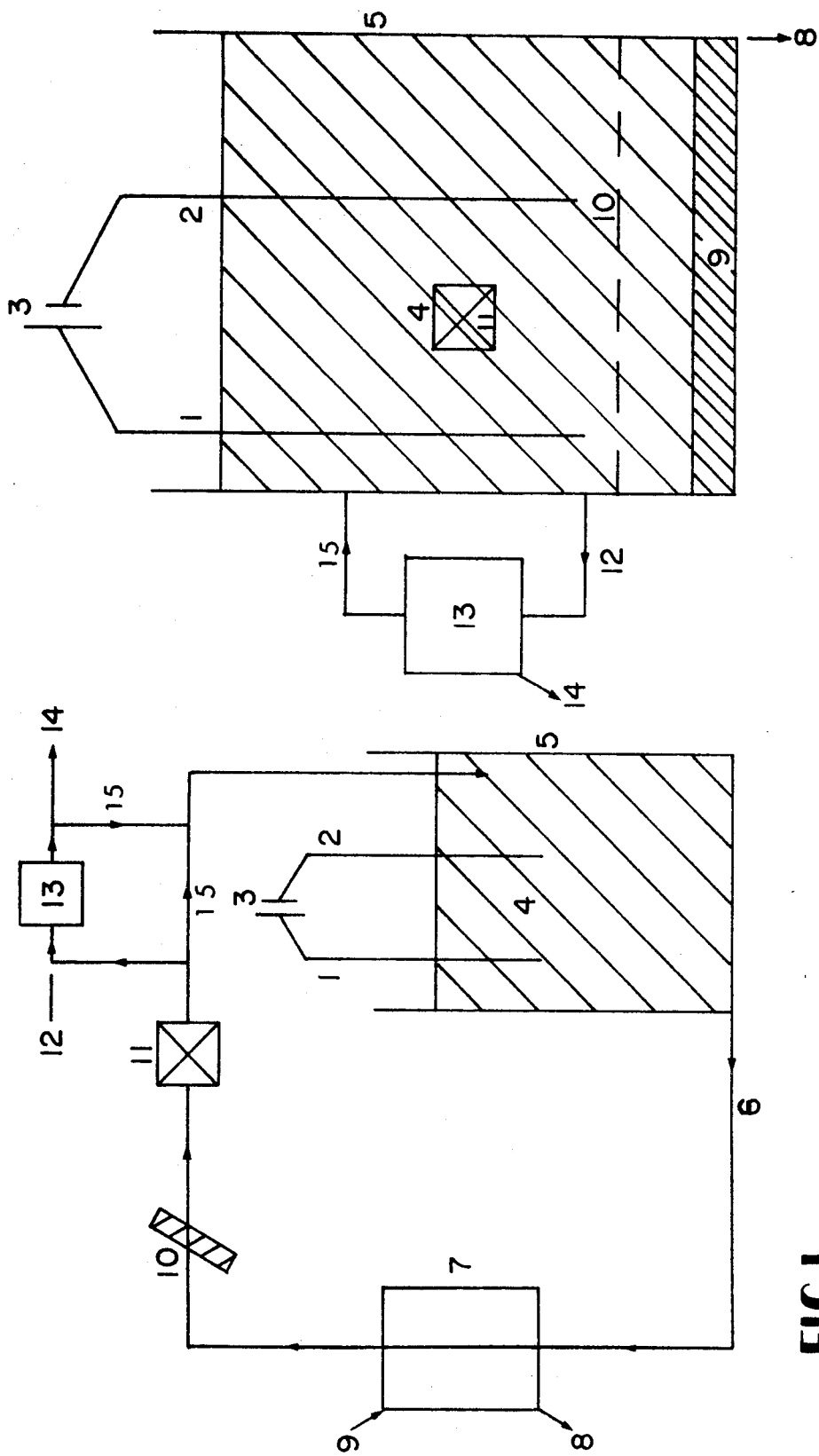

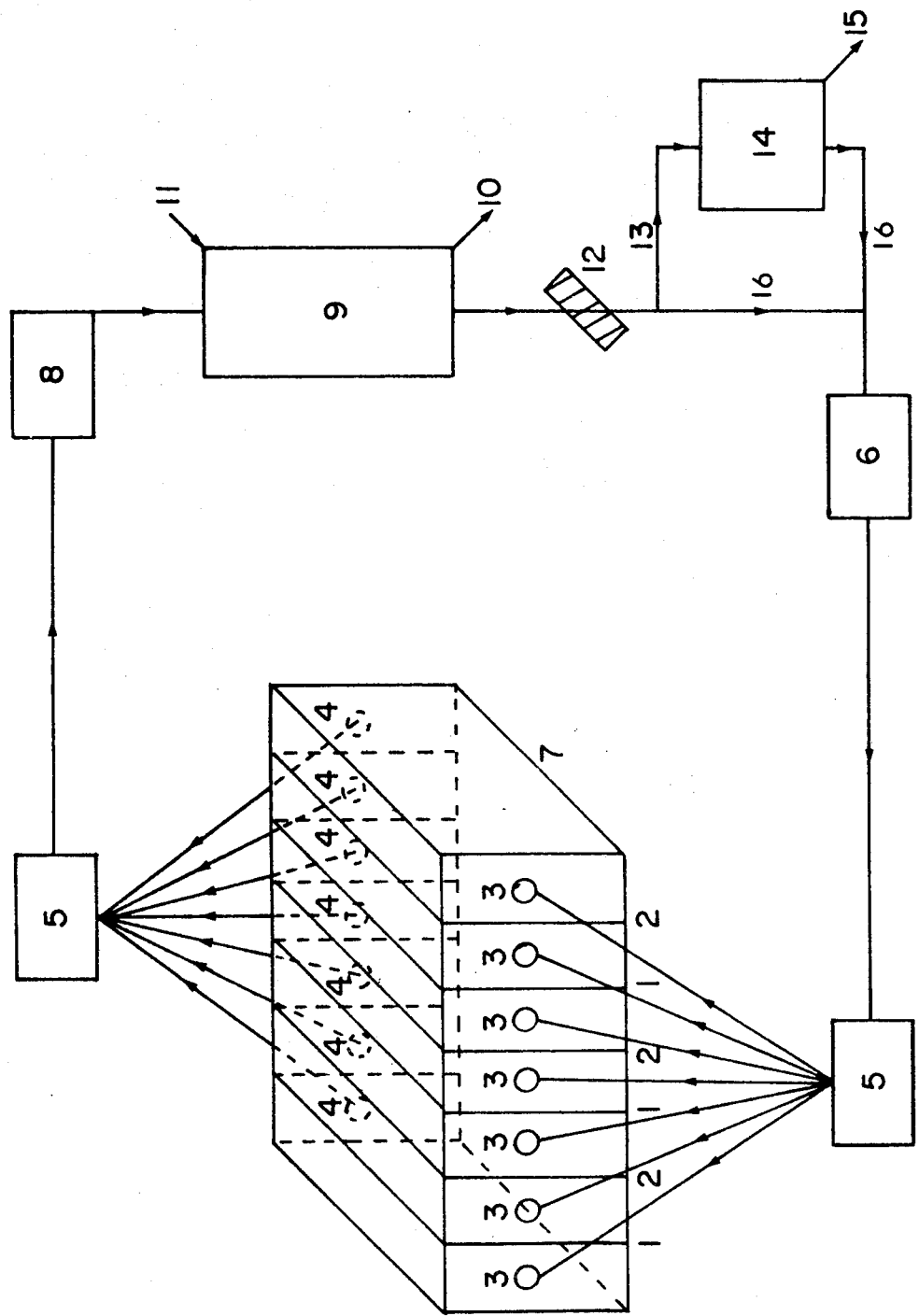

METHOD OF PRODUCING SOLUTIONS CONTAINING CUPROUS IONS

This is a divisional application of U.S. Ser. No. 237,061, filed Mar. 22, 1972.

This invention relates to methods of separating and recovering copper from materials containing copper and of preparing purer forms of copper, via solutions of certain cuprous salts in acidified mixtures of water and organic nitriles. The invention includes methods for preparing solutions of copper salts of compositions which are useful for copper recovery or copper purification. Further details of organic nitriles and cuprous salts are given later in this application.

BACKGROUND OF THE INVENTION

Conventional methods of extracting and refining copper are described by A. Butts in "Copper the Metal its Alloys and Compounds" Reinhold Publishing Corp., New York, 1954. The most common method is pyrometallurgy through flotation of crushed ore, then smelting in an oxidising atmosphere to blister and anode copper, and finally electrorefining of anodic to cathodic copper, via acidic cupric sulphate solutions. This method has the disadvantages of pollution by sulphur dioxide, high capital and operating costs and losses of valuable materials in fumes and slags. Another method is that of hydrometallurgy, i.e. leaching copper oxides or sulphides with sulphuric acid, sometimes in the presence of ferric sulphate, to give cupric sulphate solutions. Copper itself can be dissolved in hot sulphuric acid under oxidising conditions to give cupric sulphate solutions. In these methods the cupric sulphate solutions are then stripped of their copper by electrowinning or cementation. More recent procedures include treating the ore with an oxidising or reducing roast, the TORCO segregation process, bacterial leaching, and leaching with ferric chloride or ammoniacal solutions. All these processes require a final step of electrorefining or electrowinning via aqueous acidified cupric sulphate solutions, if one is to produce copper of sufficient purity for many commercial processes. The electrorefining step is a slow process, typical tankhouse cycles being 11–14 days. A number of tankhouse staff are needed, handling of anodes, treatment of slimes, attention to short circuits and cathode quality, all create problems. The electrowinning process is also slow and consumes considerable quantities of power, but costs associated with anode handling are reduced, compared to electrorefining.

SUMMARY OF THE INVENTION

It is a main object of this invention to provide a composition of matter suitable for processing copper via cuprous ions and which comprises a composition of matter comprising at least 15% by volume water, an acid selected from the group consisting of sulphuric, sulphurous and nitric acid, at least 4% by volume of an organic nitrile and a copper salt of the corresponding acid.

Various other objects, advantages, methods of using the compositions and explanation of terms will become apparent from the detailed description and discussion of preferred embodiments which appear hereinafter.

DESCRIPTION OF THE PREFERRED EMBODIMENTS

Some preferred aspects of the invention are described with reference to the drawings. However, it is to be understood that the drawings are diagrammatic only and are not intended to be limitative of the invention. In the drawings:

FIG. 1 illustrates the layout of a system including an electrochemical disproportionation cell from which anolyte is removed and after treatment returned to the cell. This system is suitable for copper powder electrorefining.

FIG. 2 illustrates a modification of FIG. 1 and relates to copper powder electrorefining.

FIG. 3 illustrates the layout of apparatus for use in electrochemical disproportionation and in particular a design of the cells, plus a circuit illustrating the method of cuprous electrowinning.

Figure 6:
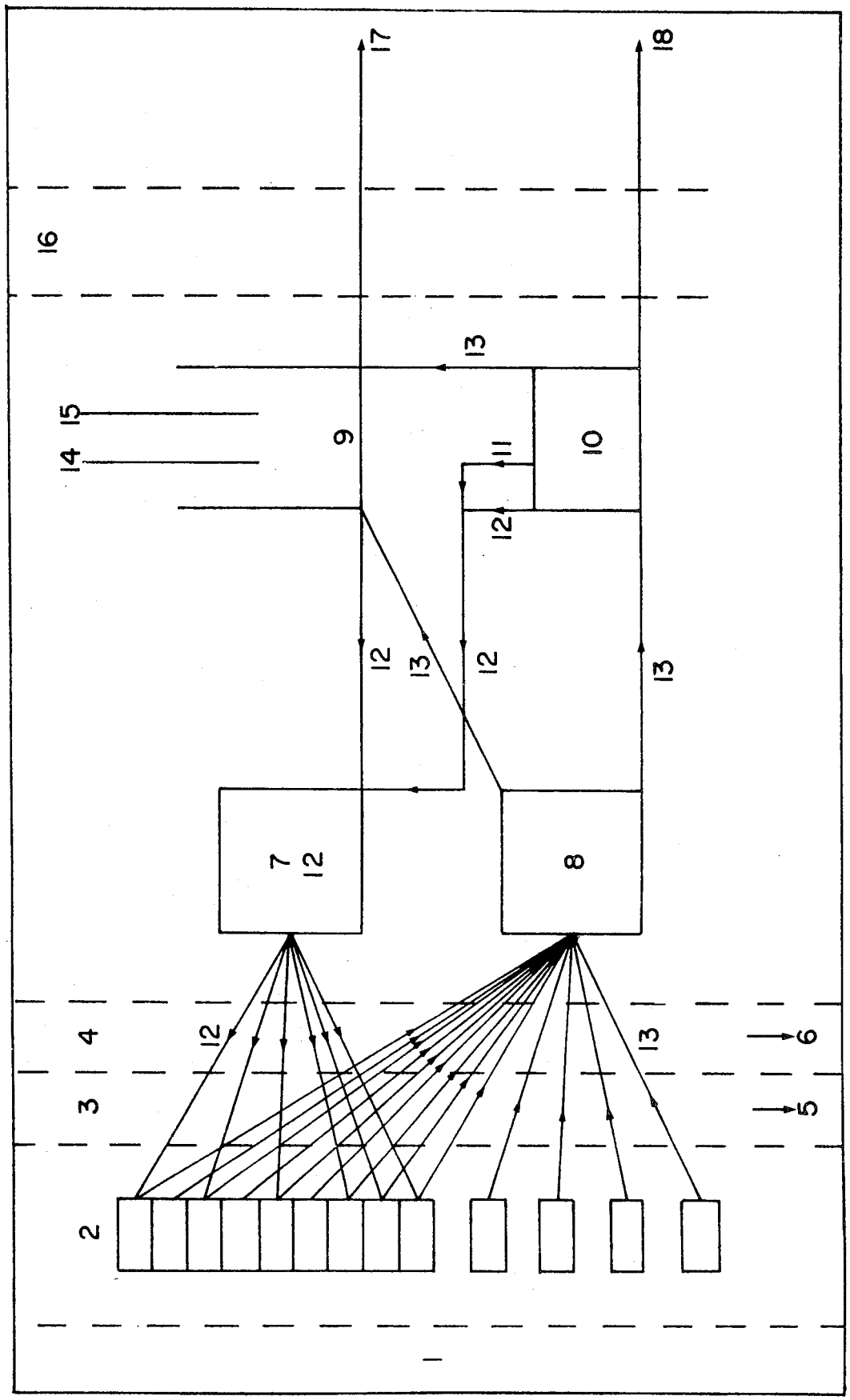

FIG. 6 summarizes and illustrates methods of generating cuprous salt solutions, their purification, methods for their disproportionation to cupric salt solutions and copper and methods of converting the cupric salt solutions to cuprous salt solutions.

Figure 7:
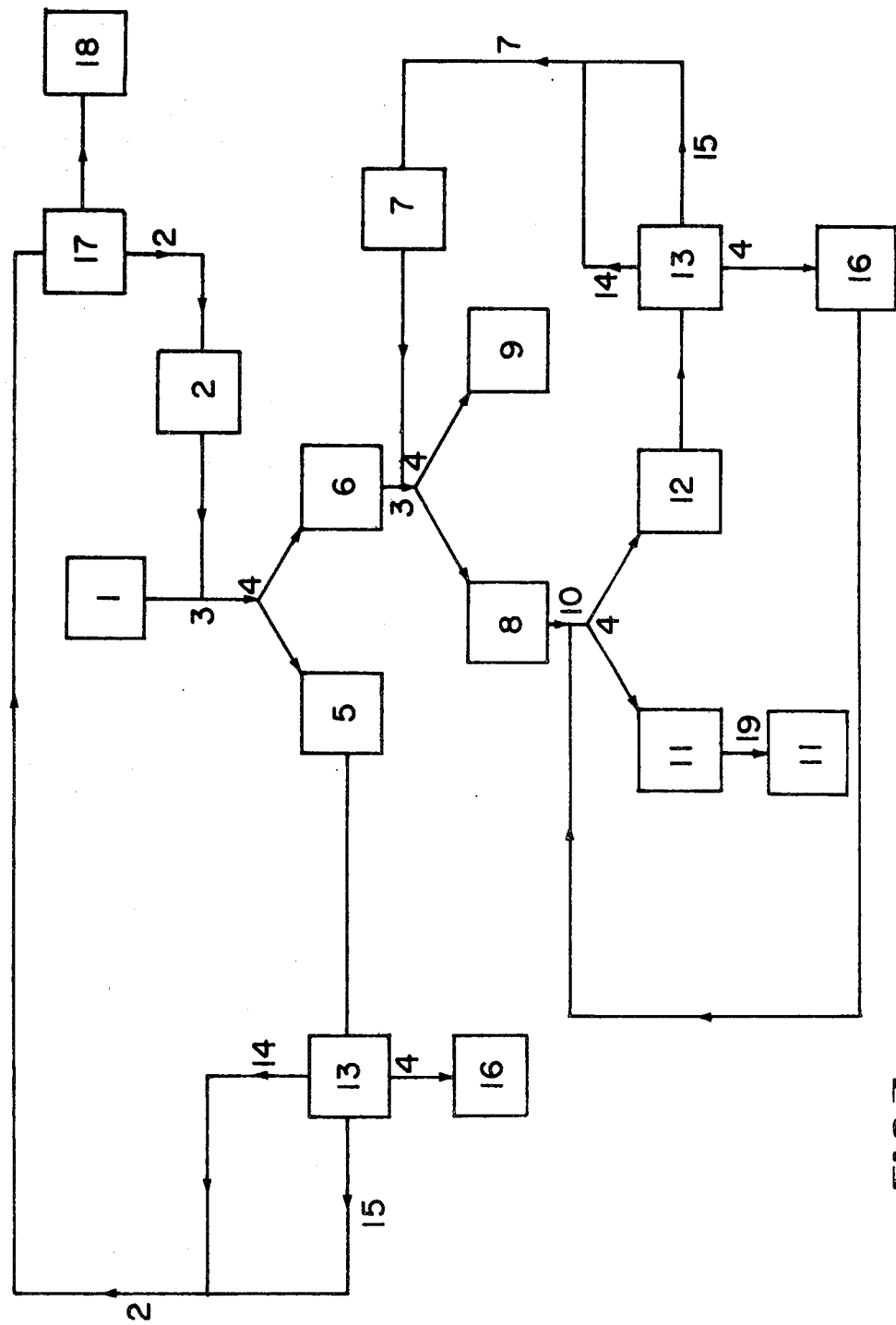

FIG. 7 is a flowsheet illustrating the separation of copper and silver from materials containing those metals.

The overall field of this invention is illustrated in FIG. 6 (explained in detail hereinafter) and involves methods of producing solutions of certain cuprous salts in acidified mixtures of suitable organic nitriles and water. This is followed by two methods of disproportionating the cuprous salt to copper and cupric salt either electrochemically or by thermally removing the nitrile from the solution. The cupric salt which is produced by disproportionation is then converted to cuprous salt by reduction with copper or reaction with other suitable substances and the process continues. Reduction of $Cu^{2+}$ by copper is a method of copper refining, reduction by other reducing agents is a method of copper winning from cuprous solutions and reaction with cuprous or cupric sulphide is a method of leaching by oxidising the sulphide.

The reactions which produce cuprous salts are with one exception reactions between solids and reagents in solution, and as such have the usual advantages when performed with well agitated, finely divided solids at elevated temperatures if possible. The use of volatile hydrolyzable nitriles in aqueous acidified solutions and of oxidisable cuprous ions imposes limitations and it is desirable to operate whenever possible in sealed systems in the absence of significant amounts of oxygen.

Some of the methods described are named for the purposes of identification in this application as cuprous electrowinning, cuprous winning, copper powder electrorefining and copper powder refining, but it will be apparent from FIG. 6 that the four processes are very closely linked. Thus a cupric solution from the anolyte of copper powder electrorefining could be used to oxidise copper produced by thermal disproportionation and thus convert the powder to cathodic copper.

The field of this application can be further summarized as:

a. Methods and compositions for producing cuprous salt solutions from slightly soluble cuprous or cupric salts.
b. Methods and compositions for leaching copper, from materials containing copper and insoluble impurities, as cuprous salt solutions.
c. Methods and compositions for reducing solutions of cupric salts to solutions of cuprous salts.
d. Methods of electrochemically disproportionating cuprous salt solutions to copper and cupric salt solutions in the presence of soluble impurities.
e. Methods of thermally disproportionating cuprous salt solutions to copper and cupric salt solutions in the presence of soluble impurities.
f. Linking these concepts in a variety of ways, as sketched in FIG. 6, to give new processes for producing purer forms of copper metal from materials containing copper, cupric ions, or cuprous ions. Some of these ways are described e.g. as cuprous electrowinning, copper powder refining, but we do not exclude other methods of processing copper e.g. leaching of cuprous sulphide by $Cu^{2+}$, which link together the five embodiments (a) – (e), and are shown in FIG. 6 but are not given a new defined name.

For example, a solution of cuprous sulphide could be treated with cupric sulphate to give a cuprous solution. This is then thermally disproportionated to copper and cupric sulphate. The copper is then dissolved by an anolyte from a cell in which electrochemical disproportionation is taking place and deposited as cathodic copper in that cell. The cupric sulphate from the thermal disproportionation is reacted with atomised blister copper to give a cuprous sulphate solution and this is again thermally disproportionated, but this time the cupric sulphate solution is not recombined with the nitrile distillate, rather a higher boiling nitrile is added, the $CuSO_4$ is reduced with iron to cuprous sulphate and the solution is then electrochemically disproportionated.

The methods are all different from the current methods for extracting copper and or recovering purer copper, from materials containing copper or from solutions containing copper salts. Specific details, such as compositions of solvents, methods of preparing solutions, nature of nitriles and reductants, and notional design of equipment, are presented later in the application, together with examples illustrating some of the applications of the methods.

Processes Based on Electrochemical Disproportionation

Copper Powder Electrorefining and Cuprous Electrowinning

In one sense the division of methods is artificial because in both, cuprous sulphate or bisulphate is disproportionated electrochemically to give cathodic copper using an inert anode in a more or less conventional way, with an electrolyte composed of cuprous sulphate or $CuHSO_4$ in water, an organic nitrile and sulphuric acid, plus additives, such as glue and sodium alkylaryl sulphonates, designed to improve the quality of the cathodic deposit. The anolyte, containing cupric sulphate, is removed continuously and is replaced by fresh cuprous sulphate electrolyte. The division of methods is based on what is done with the anolyte containing cupric sulphate.

In the preferred form of copper powder electrorefining, the anolyte is reacted with copper, or materials containing copper, preferably in a finely divided state and preferably containing a high (>99%) proportion of copper, when reaction 1 of FIG. 6 occurs. Other possible reactions (3, 8 and 10 of FIG. 6) with suitable materials may occur if these are also present in the copper, all of which produce cuprous salt solutions. The species M of reaction 8 are reductants which are often present in the copper containing material, e.g. iron or nickel. Such species usually pass into the electrolyte as soluble oxidation products (e.g. salts of $Fe^{2+}$ and $Ni^{2+}$). Inert components of the copper containing materials, such as gold, silver, lead, silica, bauxite and carbonaceous material form a "slime." Basic impurities react with acid in the electrolyte. The dissolution of $Cu_2O$ by $H_2SO_4$ to form extra cuprous sulphate and eventually cupric sulphate as well as air oxidation of $Cu^+$, help to balance losses of $Cu\ SO_4$ due to reducing agents in the copper. The cuprous sulphate solution produced by these reactions replaces the anolyte in the electrochemical cell, after any necessary treatment, such as filtration, removal of soluble impurities and adjustment of acid and cuprous levels.

In the preferred form of cuprous electrowinning, the solution of cuprous sulphate which replaces the anolyte containing cupric sulphate is produced by any suitable method, but the anolyte containing cupric sulphate is not reduced with copper or materials containing copper, although it may be reduced by other reducing agents such as iron (reaction 8 of FIG. 6).

The distinction between the two methods is used because in copper powder electrorefining the process is effectively transferring copper from "powdered" materials containing copper to a purer form on a cathode, whereas in cuprous electrowinning, only 50% of the copper initially is being electrowon from a solution of cuprous sulphate, but subsequent reductions of $CuSO_4$ then effectively increase this recovery of cathodic copper.

As noted, the electrolytic part of the process is very like that for conventional electrowinning of copper from aqueous cupric sulphate solutions (cf. Butts loc. cit) except that the electrolyte is different and anolyte must be removed and replaced by fresh cuprous electrolyte. Anodes coated with lead oxide are not "inert" to cuprous solutions and so are not suitable inert anodes. Lead lined vessels are suitable containers, but precautions may have to be taken to contain volatile nitriles and minimise oxidation by air. With most inert anodes, e.g. carbon, it has been found that there are substantial advantages of lower operating voltage in having good circulation of electrolyte past the anode, but with other, more expensive anodes, e.g. platinum, we find that the degree of circulation has less effect on the operating voltage. Cathode quality is improved at lower operating temperatures, but the operating voltage is higher, so that a balance between these factors is needed. An operating temperature of between 20°–45°C is preferred. High temperatures (e.g. >50°C) encourage loss of nitrile by hydrolysis.

The electrode reactions are believed to be:

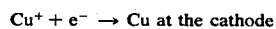

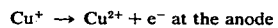

The cupric sulphate, which is produced at the anode in increasing quantities as reaction proceeds, reduces the efficiency of the process, because it dissolves copper from the cathode to a limited extent and more seriously, because of the electrode process $Cu^{2+} + e^- \rightarrow cu^+$ at the cathode. Thus, cupric sulphate should be prevented from reaching the cathode in significant amounts. As noted, this is best done by continuously replacing anolyte with fresh cuprous sulphate electrolyte.

Copper powder electrorefining offers a new way of converting impure particulate copper to purer cathodic copper without casting anodes. Anode handling is simplified and being a one electron process, power consumption per pound of copper is low, although slightly higher than "cupric refining" of copper anodes.

Without removal of $CuSO_4$, the electrochemical disproportionation proceeds satisfactorily for only about 10% recovery of copper. After this, the efficiency drops rapidly.

Precautions should be taken to minimise oxidation and to contain volatile, toxic and inflammable nitriles and there are advantages in using a high boiling water solule nitrile, such as 2-hydroxycyanoethane under an inert atmosphere although voltages are higher than with an equivalent mole proportion of acetonitrile.

Two of the methods for semi-continuous operation of copper powder electrorefining are outlined in FIGS. 1 and 2. The method of FIG. 1 is preferred. In FIGS. 1 and 2, representing two possible methods of copper powder refining the numerals represent: 1 — an inert anode e.g. of carbon, 2 — a copper cathode, 3 — a power supply, 4 — a cuprous sulphate, sulphuric acid, water, organic nitrile electrolyte, with or without additives, 5 — an electrolysis vessel, preferably covered with the electrolyte under a non-oxidising atmosphere, 6 — a pipe for transferring anolyte containing cupric sulphate, 7 — a reaction vessel, 8 — a system for removing insoluble slimes, 9 — a system for adding copper containing materials, preferably of high copper content, 10 — a system for removing solids from the electrolyte, 11 — a pump for circulating electrolyte, 12 — a system for bleeding off electrolyte for purification and/or adjustment of composition, 13 — a system for electrolyte purification, 14 — a system for removing impurities e.g. ferrous sulphate, extracted from the electrolyte in 13, 15 — a pipeline for returning the cuprous sulphate, sulphuric acid, water and organic nitrile electrolyte with or without additives to the electrolysis vessel. The preferred requirement for such a method is that, in conjunction with a more or less conventional electrowinning cell (5), in which copper is being electrowon from the specified well agitated cuprous sulphate solutions (4), by more or less conventional methods, the anolyte containing cupric sulphate be continously removed (6) from the vicinity of the electrodes (1) and replaced by cuprous sulphate solution (15), which has been generated as in reaction 1 of FIG. 6 by passing the anolyte over suitable finely divided material containing copper in reaction vessel (7), at such a speed that the copper dissolves as cuprous sulphate and the concentration of cupric sulphate in the cell is kept preferably below 10% of the total copper in solution. There should be provision (8) for extracting slimes, for excluding insolubles (10) from the electrolytic part of the cell and provision for removal of soluble impurities (12, 13, 14) (e.g. $FeSO_4$, $NiSO_4$) from the electrolyte by diversion of the electrolyte.

The electrochemical process, irrespective of the nature of the replacement of anolyte by $Cu_2SO_4$ solution, operates preferably at a current density of 5–30 amps/sq.ft, more preferably 5–20, but for the method outlined in FIG. 1, the current density, the total anode area, the rate of flow of anolyte, and the rate of reaction between Cu and $CuSO_4$ should be coordinated to keep the concentration of $CuSO_4$ in the cell at an acceptable level. Coordination can also be influenced by varying the temperature of operation, preferably between 20°–55°C and the size of the copper containing material.

In cuprous electrowinning one form of which is illustrated by FIG. 3 it is necessary to include a reducing cycle to reduce the anolyte and return it to the cell as cuprous sulphate, with if necessary, prior removal of the oxidation products of the reductant. With iron for example as reductant, the process is very closely related to copper powder electrorefining because the reactions in the reducing circuit are thought to be as follows:

| | |
|---|---|
| Initially, with excess iron | $Cu^{2+} + Fe \rightarrow Cu + Fe^{2+}$ |
| With more $Cu^{2+}$ | $Cu^{2+} + Cu \rightarrow 2\ Cu^+$ |
| Overall | $2Cu^{2+} + Fe \rightarrow 2\ Cu^+ + Fe^{2+}$ |

Such a cuprous solution can replace the anolyte, preferably after removal of some of the ferrous sulphate. Other methods of reduction or of converting cupric sulphate to cuprous sulphate are outlined in FIG. 6 and are described in detail later.

Compared with the conventional electrowinning of cupric solutions in water, the electrochemical disproportionations just described proceed at much lower voltages, gases are not evolved at the inert anode, and being a one electron process, power consumption is less per pound of copper treated. A disadvantage is the need for covered very well stirred electrolyte.

Copper powder electrorefining offers a convenient way of converting copper powder to purer cathodes without the necessity for melting the powder and electrorefining a cast anode. The use of an inert anode avoids the trouble associated with the use of soluble copper anodes.

A convenient cell arrangement, allowing efficient circulation, removal of anolyte and replacement by fresh electrolyte, is shown in FIG. 3. In FIG. 3 a form of cuprous electrowinning is illustrated but the main feature is a design which is a preferred form of the electrolytic cell for electrochemical disproportionation. The electrodes are connected to a power supply, which is not shown. The numerals represent: 1 — an inert anode, e.g. of carbon, 2 — a copper cathode, 3 — inlet pipes for admitting at high speed an electrolyte of cuprous sulphate in acidified water containing an organic nitrile, with good agitation past the electrodes, 4 — outlet pipes for removing anolyte containing cupric sulphate, 5 — high speed circulating pumps, 6 — storage vessel for cuprous sulphate solutions, 7 — electrolysis vessel, preferably covered with the electrolyte under a non-oxidising atmosphere, containing the cuprous sulphate solution, 8 — storage for cupric sulphate solutions, 9 — reaction vessel for reduction of cupric sulphate solutions, 10 — system for removing insoluble impurities (slimes) 11 — system for adding reductant, 12 — a system for removing solids from the electrolyte, 13 — a system for bleeding off the electrolyte, 14 — a system for purifying the electrolyte and/or adjusting its composition, 15 — a system for removing impurities removed from the electrolyte in 14, 16 — a system for conveying the electrolyte containing cuprous sulphate.

THERMAL DISPROPORTIONATION OF CU$^+$.

Copper can be recovered from aqueous solutions of cupric salts by reduction methods other than the electrowinning process. With solid reducing agents such as iron, nickel and zinc, the process is known as cementation. With reducing agents, such as sulphur dioxide, hydrogen and carbon monoxide, it is known as precipitation.

Cementation suffers from the disadvantage that the "cupreous powder" is very finely divided, well oxidised and badly contaminated by the solid reducing agent and other species which are reduced concurrently. The process is inefficient because the reducing agent becomes coated with copper and is not exposed to more cupric salt solution.

Precipitation is usually from ammoniacial solutions and high temperatures and pressures are needed. Hydrogen is the preferred reducing agent and sulphur dioxide gives incomplete reduction at high temperature and pressure.

Cement copper must be purified by the pyrometallurgical route and losses of copper are a problem.

Thermal disproportionation of Cu$^+$ involves precipitation of copper from acidified solutions of cuprous salts in mixtures of volatile organic nitriles and water by thermal removal of the nitrile e.g. by distillation. The solution is free of solids prior to the winning and if necessary certain soluble impurities have been removed prior to the winning step. Thus a pure copper, whose quality as a powder can be controlled by additives, "seeds" and the conditions of precipitation, is produced. This powder is a more desirable product than "cupreous powder" produced by cementation.

The process is applied to solutions of cuprous salts, prepared for example as outlined in FIG. 6. Control of pH prevents precipitation of salts, e.g. of Fe$^{2+}$ and of SO$_3^{125}$, and precipitation of CU$_2$O or CuOH. The concentration of acid influences the nature of the precipitated copper, high acidities (>5% H$_2$SO$_4$ by volume) tend to give less discrete particles. The organic nitrile is removed in whole or in part from the cuprous solution, usually by efficient distillation, preferably under a reduced pressure. This allows lower temperatures for boiling and thus minimises hydrolysis of the nitrile. The distillation is preferably carried out in the absence of significant amounts of oxygen and recovery of copper is enhanced by using a reducing or non-oxidising atmosphere (e.g. of N$_2$). The degree and nature of stirring, during removal of the nitrile, the speed at which nitrile is removed, and the presence of additives and seeds all influence the nature of the precipitated copper. We prefer to remove the nitrile slowly from a well agitated "tumbling" solution containing glue and other additives such as sodium alkylarylsulphonates or ammonium lignin sulphonates. The nitrile usually comes off as an azeotrope with water.

Once the proportion of nitrile to cuprous ion in solution is below 2–3 moles to one of cuprous ion, the cuprous ion disproportionates to give copper and a cupric salt.

$$2\ Cu^+ \rightarrow Cu + CU^{2+}$$

Removal of the nitrile is continued until the desired amount of copper powder is obtained. This copper is removed by a conventional solid-liquid separation (e.g. centrifuged), is washed and dried. This portion of the process uses conventional technology for handling copper powders, separating them from liquids and for avoiding their oxidation (cf. Butts). A preferred modification is in provision to recover the valuable nitriles by distillation from the "wet copper" and the washings. A preferred method of washing is to use the acidified distillate of the nitrile-water and return this to the circuit. The copper is removed from the circuit and is washed with hot acidified water, then with hot water in a non-oxidising atmosphere.

The process of thermal disproportionation may be modified if the solutions of cuprous salts in a volatile nitrile and acidified water contains ions e.g. Ag$^+$, which are more easily reduced to solids in the medium than is cuprous ion to copper. As the nitrile is removed, the first reaction is, as illustrated by silver.

$$Cu^+ + Ag^+ \rightarrow Cu^{2+} + Ag$$

followed by $$Cu^+ + Cu^+ \rightarrow Cu^{2+} + Cu.$$

Thus it is desirable to carry out the thermal disproportionation in at least two steps, because the first solids which are precipitated will contain high proportions of the more easily reduced material.

An alternative procedure for removing reducible species, especially in the case of solutions containing significant amounts of silver salts, is to cement the reducible species with an excess of copper to produce a colourless solution, prior to thermal disproportionation. Reaction 13 of FIG. 6 takes place readily with finely divided copper and solutions of silver salts in acidified nitrile-water mixtures in the absence of Cu$^{2+}$.

This method of thermal disproportionation usually enables one to recover a maximum of 50% of the copper from a cuprous salt solution, the other 50% is cupric salt. A highly desirable addition to the basic invention is to recycle the nitrile-depleted cupric salt solution with the distilled azeotrope containing the nitrile and the washings, then to regenerate cuprous salts from cupric by any of the methods outlined in FIG. 6 or by any other acceptable method. This is known as cuprous winning, copper powder refining or cuprous leaching, depending on the method of regeneration.

CUPROUS WINNING

Figure 4:
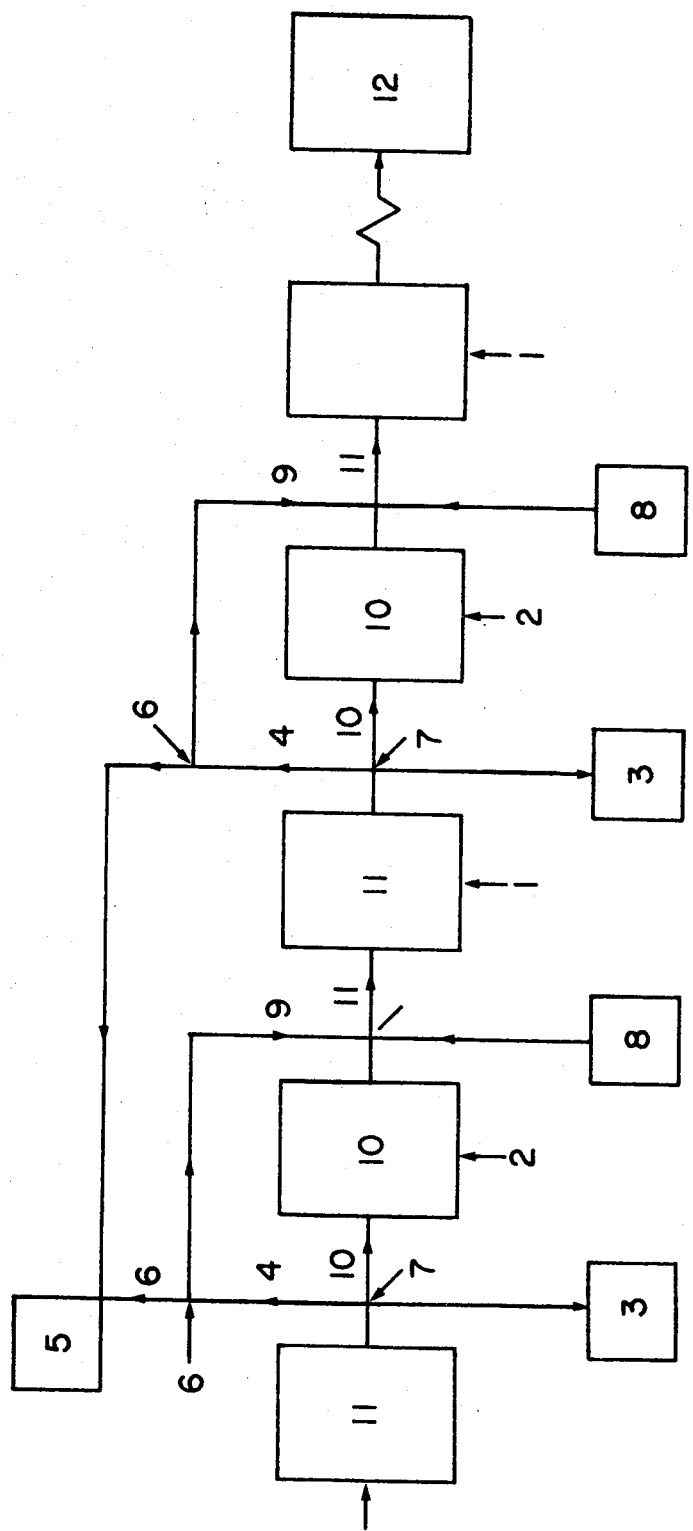
FIG. 4 illustrates the layout of a system for cuprous winning.

This is illustrated in a preferred form in FIG. 4.

In FIG. 4 the numerals represent: 1 — a distillation vessel for disproportionation of cuprous salt solutions, 2 — a reaction vessel for reduction of cupric salt solutions, 3 — a system for removing, washing and drying copper powder, 4 — removal of volatile nitrile and its azeotrope and condensation, 5 — vessel for storing distilled nitrile and its azeotrope, 6 — system for splitting the distillate into roughly equal proportions, 7 — a system for effecting separation of solids and liquids, 8 — a system for adding reducing agent to the reaction vessel, 9 — a system for adding nitrile and its azeotrope to the reaction vessel, 10 — a solution containing some cupric salt solution in a solution depleted of nitrile by distillation, 11 — a solution of cuprous salt in acidified water containing a volatile organic nitrile, with or without additives and copper seeds, 12 — copper depleted solution containing oxidised reductant.

For example, the cupric salt in the nitrile-depleted solvent (10), prepared by thermal disproportionation of a cuprous salt solution (11), is combined (9), with the nitrile-water azeotrope distillate and washings and is reduced by the addition of a suitable reducing agent (8), such as iron or $SO_2$ in proportions which satisfy the stoichiometry of equations 8 or 9 of FIG. 6.

$$Cu^{2+} + Red \rightarrow Cu^+ + Ox^+$$

(where Red is the reductant and $Ox^+$ is its oxidised form)

The reduced solution of cuprous salt is filtered if necessary and the cycles of nitrile removal, copper precipitation and cupric salt reduction are repeated until the desired recovery of copper is achieved.

Ideally, the overall material balance is represented by $$Cu^{2+} + 2Red \rightarrow Cu + 2Ox^+$$

but this would require an infinite number of cycles, so a choice must be made, and the remaining small amount of copper in solution is recovered in other ways, e.g. cupric cementation by iron.

It will be appreciated that the "feed" for a thermal disproportionation followed by a cuprous winning process may be a solution of cupric sulphate, to which sufficient suitable nitrile has been added, followed by reduction with the same suitable reducing agent, e.g. iron or $SO_2$, chosen for the later steps of the cuprous winning process.

Precautions against loss of the valuable, volatile toxic and inflammable nitrile are normally taken, e.g. reactions in sealed vessels or under condensers. The process is best suited to an enclosed system with oxygen excluded as much as possible.

Recovery or use of the oxidised form of the reductant, of traces of undistilled nitrile, and of traces of copper in the spent solution is an economically desirable part of the process. Where $SO_2$ is the reductant, the acid produced may be used for leaching of oxidised copper to give cupric sulphate solutions, which may be reduced to cuprous sulphate or sulphite solutions as outlined and thus a continuous "cuprous winning" is achieved.

COPPER POWDER REFINING

Figure 5:
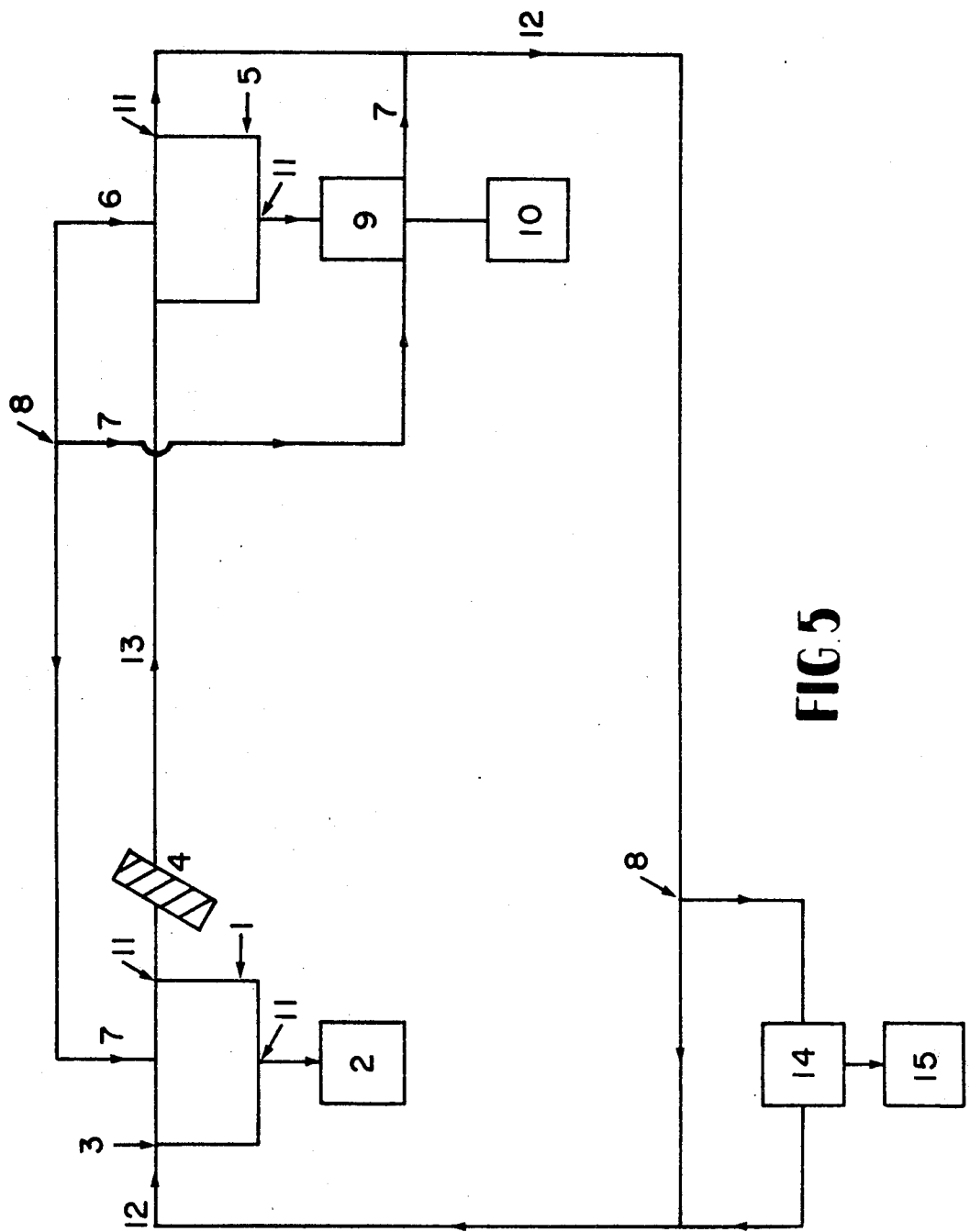
FIG. 5 illustrates the layout of a system suitable for continuous copper powder refining.

This principle is illustrated in a preferred form of a continuous process in FIG. 5.

In FIG. 5 the numerals refer to: 1 — a reaction vessel for converting copper and cupric salts to cuprous salts, 2 — removal of insoluble impurities (slimes), 3 — system for adding particulate materials containing copper to the reaction vessel, 4 — system for removing solids from the cuprous salt solution, 5 — Distillation vessel for disproportionation of cuprous salt solutions, 6 — removal of distillate containing a volatile nitrile or its azeotrope, 7 — condensed nitrile or its azeotrope, 8 — system for dividing a liquid into two portions, 9 — removal of copper powder and its washing with condensate, 10 — system for further washing and drying of copper powder, 11 — system for separating solids and liquids, 12 — solution containing cupric salt in a nitrile depleted solution, 13 — solution of a cuprous salt in acidified water containing a volatile organic nitrile with or without additives, 14 — system for purifying solution 12 and adjusting its composition, 15 — system for removing soluble impurities.

Conventional methods of purifying copper powders (cf. Butts) involve either pyrometallurgical treatment followed by cupric electrorefining of copper anodes, for low grade powders (<98% copper) or melting and casting to anodes, followed by cupric electrorefining. These methods involve significant losses of copper, are slow and require considerable handling of the copper. "Cupreous powder" and the TORCO concentrate, for example, require the comlete smelting and refining operation to produce pure copper.

Our method of copper powder refining avoids pyrometallurgy with its high capital cost, and also avoids the slow cupric electrorefining step. It is a cheaper and faster method of preparing purer copper from any finely divided form of copper-containing material, than is any existing method known to us. Capital costs are relatively low compared to pyrometallurgy.

The method is based on thermal disproportionation, except that in the preferred procedure one starts with a solution of a suitable cupric salt in a mixture of sufficient of a suitable volatile organic nitrile and acidified water and reduces this with impure copper as reducing agent (cf. reaction 1 of FIG. 6). The resulting cuprous solution is then transferred to a distillation vessel (5) and distilled to remove nitrile (6), precipitate the copper (9) and regenerate cupric salt. The cupric salt solution (12) and distillate (7) are combined and are transferred to a reaction vessel (1) in which reduction with copper (3) is repeated. Thus ideally, the copper concentration of the electrolyte is unchanged, and crude particulate copper (3) is converted to purer particulate copper (10). The thermal disproportionation step in which nitrile is distilled to precipitate copper from the cuprous solution is as already described and the method of performing reaction 1 is described in detail later. The method is preferably continuous, with several cycles of copper leaching and copper precipitation taking place in reaction and precipitation vessels respectively. The two vessels are separated by conventional systems for removing solids from the electrolyte.

Suitable materials containing finely divided copper metal are efficiently agitated by conventional solid-liquid leaching procedures (cf. Butts) in vessels sealed from the atmosphere, with a solution of a suitable cupric salt (preferably cupric sulphate) in a solvent which is kept acidic with a suitable acid throughout the process and which contains water and sufficient of a suitable organic nitrile, preferably acetonitrile. The preferred temperature of leaching is 40°–65°C, but this is not crucial, although leaching is faster at elevated temperatures. The copper and some other oxidisable and basic materials (e.g. iron, tin, copper oxides, arsenic, nickel and to some extent bismuth) dissolve, to give cuprous solutions, plus soluble impurities. Other impurities, e.g. gold, silica, alumina, carbonaceous material, lead, and to a large extent antimony and silver, do not dissolve, they form "slime." These are filtered off at approximate intervals. The cuprous solutions are separated from any solid material e.g. by filtration, settling, or centrifuging, and the organic nitrile is separated from the cuprous solution. Removal of volatile nitrile is continued until the desired amount of copper is obtained and separated, as outlined. The cupric salt is recycled to the leaching tank, after combining with the nitrile-water distillate, to dissolve more copper from the copper containing material and to generate more cuprous solution by reaction 1. The process is preferably continuous. Portions of the nitrile-deficient electrolyte are treated by conventional methods (c. Butts loc. cit.) from time to time to keep soluble impurities, e.g. OX⁺ at an acceptable level, consistent with the desired purity of the precipitated copper.

Copper powder refining can of course be a batch process, using a reservoir of Cu⁺ salt, as shown in FIG. 6, with removal of cupric solution and eventual reduction with copper, using the distillate or some other source of nitrile. Suitable heat exchangers are desirable, since in principle there is very little consumption of energy.

Oxygen should be excluded as much as possible from the process, because both cuprous solutions and the wet copper powder are oxidised to some extent by oxygen. A reducing or non-oxidising atmosphere is desirable (e.g. $N_2$). Precautions against loss of the volatile, toxic and inflammable nitriles should be taken and the process is best suited to an enclosed system. The solutions are not particularly corrosive, except in the leaching tank, which should be resistant to the oxidising power of $Cu^{2+}$ in the presence of nitriles. Lead, glass and PVC are suitable materials, but stainless steel is not inert over long periods.

CUPROUS LEACHING

This is closely related to copper powder refining, except that in the preferred method cuprous salt is regenerated from the cupric salt solution plus the nitrile azeotrope produced by thermal disproportionation, by reacting $Cu^{2+}$ with cuprous sulphide, or materials containing cuprous and sulphide ions or with cupric sulphide, or materials containing cupric and sulphide ions, in a leaching vessel under the conditions of reaction 3 or 5 or of the combined reaction of 3 and 5 of FIG. 6 respectively. The resulting cuprous salt solution is filtered, freed of sulphur, purified and is thermally disproportionated.

The net result is either

or

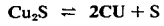

or

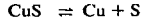

so that effectively copper sulphides are converted to copper and sulphur via cuprous ions. The reactions are equilibra so that continuous removal of cuprous salt and sulphur and replacement with fresh cupric sulphate solutions is a desirable feature.

Cuprous leaching has the advantage that, unlike smelting of copper sulphides, sulphur dioxide is not produced thus minimising pollution and the cuprous salt solution produced by the leach is readily converted to copper. In principle no chemicals are consumed. The method is simpler than ferric sulphate leaching followed by electrowinning in aqueous solution.

As noted later, reactions 3 and 5 and the combined reaction require quite high concentrations of acid and of volatile nitrile. Chalcopyrite is not leached effectively by this procedure but if it is preheated with sulphur to more than about 400°C a leachable form of copper sulphide is produced.

Much the same scheme as is illustrated in FIG. 5 is preferably used for continuous cuprous leaching with the reaction vessel suitably designed for operation of reactions 3 or 5 or the combined reactions.

METHODS OF PREPARING SOLUTIONS OF CUPROUS SALTS

The process of electrochemical and thermal disproportionation depend on having suitable solutions of cuprous salts, preferably of what we believe to be cuprous sulphate or $CuHSO_4$ in the first process and $Cu_2SO_4$, $CuHSO_4$, $CuNO_3$ or $CuHSO_3$ in the second.

Cuprous salts, such as cuprous sulphate, are not stable in aqueous solutions at useful concentrations and "cuprous copper" only exists in completely aqueous solution at a useful concentration when complexed with suitable bases, as in $CuCl_2^-$, $Cu(NH_3)_2115$ and $Cu(CN)_3^{2-}$. The chemistry of monovalent copper is outlined in Butts (loc. cit.). We believe that one of the processs described here which are base on "cuprous chemistry" in nitrile-water mixtures are possible in purely aqueous solvents.

We have found that in the presence of an organic nitrile, solutions of cuprous salts, e.g. those believed to be $Cu_2SO_4$, $CuClO_4$, $CuNO_3$, $CuHSO_4$, and $CuHSO_3$, are stable, even in highly aqueous solutions. In general, more than 2.5 moles of the nitrile per mole of stabilized cuprous ions, are needed for stability. The role of the nitrile is believed to be that of an uncharged complexing agent which strongly solvates cuprous ion and stabilizes it with respect to its disproportionation into copper and cupric cation, even in acid solution. Suitable organic nitriles (e.g. acetonitrile) appear to solvate cuprous ion more powerfully than does water, even in highly aqueous solutions.

We have found the following reactions are practicable in solvents containing a suitable organic nitrile and usually water, but sometimes in anhydrous nitriles, to give stable solutions of what we believe to be cuprous bisulphate or sulphate, or in some cases certain other cuprous salts. A requirement is that the anion accompanying the cuprous cation (e.g. sulphate, perchlorate, bisulphite, $BF_4$) generally be "inert". That is, it should not interfere with the general chemistry of cuprous ion and copper as outlined in this application, and as required by the processes, (e.g. concentrated nitric acid dissolves copper and oxidises $Cu^+$, and $CuHSO_3$ is unstable in strongly acidic solutions, so nitrates and sulphites are generally unsuitable in processes e.g. electrochemical disproportionation, preferably requiring strongly acid conditions, but restricted forms of thermal disproportionation, preferably at relatively high pH, are possible in the presence of these anions). Relevant anions are described later in this application. sulphates or bisulphates are preferred over all other salts for the reactions shown, partly for economic reasons, but in some cases the greater solubility of copper nitrate salts is an advantage.

The reactions which produce solutions of cuprous salts are believed to proceed as shown by the following equations but the complete stoichiometry has not been established in all cases. In many cases the solutions should be filtered, their proportions adjusted to a suitable composition and by-products of the reactions partly removed before transfer to the central "storage" of cuprous salt solution, which is shown in FIG. 6 and which feeds the thermal or electrochemical disproportionation systems.

In FIG. 6 the numerals refer to the following: 1 — supplies of appropriate materials containing copper or copper salts including copper sulphides and ores, 2 — reaction vessesl in which reactions 1 - 13 take place, to produce solutions of cuprous salts in acid solutions of water and organic nitriles, 3 — systems for separating solids from these solutions, 4 — systems for adjusting electrolyte composition and purifying it as needed, 5 — removal of insolubles from the reactions 1 - 13, 6 — removal of soluble impurities from reactions 1 - 13, separated as in 4, 7 — vessel for storing cupric salt solutions, 8 — vessel for storing cuprous salt solutions, 9 — cell for electrochemical disproportionation of cuprous sulphate solutions, 10 — vessel for thermal disproportionation of cuprous salts in acidified aqueous solutions containing volatile organic nitriles including source of heat or method of reducing the pressure, 11 — removal of volatile nitrile as distillate and condensation, 12 — solution of a cupric salt in acidified water containing an organic nitrile, 13 — solution of a cuprous salt in an acidified aqueous solution containing an organic nitrile with or without additives, 14 — an inert anode attached to a power supply, 15 — a copper cathode starting sheet attached to the power supply, 16 — system for washing and drying copper, 17 — removed copper cathodes and 18 — copper powder.

METHODS OF PRODUCING SOLUTIONS OF CUPROUS SALTS IN NITRILE WATER MIXTURES

The following equations are believed to represent the stoichiometry and other products in reactions which do provide methods of preparing cuprous solutions, when the reactants shown are mixed in solutions of water and organic nitriles. Species shown above the reaction arrow are believed to be catalysts. The equilibria shown depend among other things on the proportion of organic nitrile present.

1. $Cu^{2+} + Cu \rightarrow 2Cu^+$
2. $2Cu + \frac{1}{2}O_2 + 2H^+ \xrightarrow{Cu^2+} 2Cu^+ + H_2O$
3. $Cu_2S + Cu^{2+} \xrightarrow{H} 2Cu^+ + CuS$
4. $2Cu_2S + 2H^+ + \frac{1}{2}O_2 \xrightarrow{Cu^2+} 2Cu^+ + H_2O + 2CuS$
5. $CuS + Cu^{2+} \xrightarrow{H} 2Cu^+ + S$
6. $2CuS + 2H^+ + \frac{1}{2}O_2 \xrightarrow{Cu^2+} 2Cu^+ + H_2O + 2S$
7. $3SO_2 + 4H_2O + 2Cu^{2+} \rightarrow 2Cu^+ + H_2SO_4 + 2H_2SO_3 + 2H^+$
8. $M + 2Cu^{2+} \rightarrow 2Cu^+ + M^{2+}$ (M = Fe, Ni, Zn, Cd, Co, Sn)
9. $2Ag + 2Cu^{2+} \rightarrow 2Ag^+ + 2Cu^+$
10. $Cu_2O + 2H^+ \rightarrow H_2O + 2Cu^+$
11. $Cu_2S + 2H^+ \rightarrow H_2S + 2Cu^+$ (in anhydrous MeCN)
12. $3CuO + 3SO_2 + H_2O \rightarrow CuSO_4 + 2CuHSO_3$ (or $CuCO_3$, $Cu(OH)_2$ for CuO).
13. $2Cu + 2Ag^+ \rightarrow 2Ag + 2Cu^+$.

Reaction 1 − $Cu^{2+} + Cu \rightarrow 2Cu^+$

To our knowledge, cuprous sulphate solutions have not been prepared from materials containing copper in aqueous solution. However equivalent reactions do proceed in water in the presence of certain complexing anions (e.g. $CN^-$, $Cl^-$). However the resulting cuprous complexes are not suitable for thermal disproportionation. The reaction of dry cupric perchlorate with pure copper to give $CuClO_4$ solutions in anhydrous acetonitrile is a known reaction, but such solutions are not satisfactory for thermal or electrochemical disproportionation. Until our discovery, there was no reason to believe that this reaction could be extended to reactions of other cupric salts, especially of cupric sulphate, with impure copper, in acidified solvents containing a variety of nitriles and very significant proportions of water. Indeed, before our discovery we had expected that water would be the active solvent and would disproportionate cuprous salts, when added for example to anhydrous solutions of cuprous perchlorate in acetonitrile, prepared as described in the literature. We were also unable to extrapolate to the behaviour of other salts in water-nitrile mixtures from the behaviour of perchlorates in anhydrous acetonitrile, partly because for example cupric sulphate will not satisfactorily generate solutions containing significant amounts of cuprous sulphate when reacted with copper in anhydrous acetonitrile.

Before this work, the behaviour of impurities commonly present in impure copper (e.g. iron, nickel, silver, gold, arsenic, alumina, bismuth, lead, antimony) in the new composition was also uncertain and knowledge of such behaviour is essential before the reaction can be utilized as a method of preparing cuprous solutions suitable for preparation of purer copper by thermal or electrochemical disproportionation. The reaction provides a new method of leaching copper from materials containing copper and insoluble species such as lead, gold, silica, alumina, carbonaceous material and antimony. Previously copper was leached as cupric salts using oxidising acids.

The following description of the preferred method of preparing solutions of what we believe to be cuprous sulphate or $CuHSO_4$ substantially free of cupric sulphate illustrates the method.

Mix equimolar or less than equimolar proportions of cupric sulphate, and finely divided copper (minus 16 plus 100 mesh) in a reaction vessel with a solvent containing about twelve moles of a suitable organic nitrile per mole of cupricions, plus sufficient water to dissolve the resulting cuprous sulphate or bisulphate. The solution is kept acidic with a proportion of sulphuric acid which is appropriate to the particular process, preferably between 0.5 and 10% by volume $H_2SO_4$. It is well agitated, e.g. by magnetic stirring or tumbling, preferably at a temperature of between 40° and 60°C in the absence of oxygen. Higher temperatures encourage loss of nitrile by hydrolysis, lower temperatures give slower dissolution of copper. The blue cupric sulphate solution changes to colourless as the copper dissolves. As expected, the rate of copper dissolution is enhanced by elevated temperatures, by increasingly finely divided copper and by the increased efficiency of mixing the solid and liquid phases. If necessary, the solution is filtered to remove insoluble material such as lead, gold, antimony, silver, silica, carbon, unreacted copper and alumina. If the solution develops a significan blue colour on standing in a stoppered vessel, then it is being oxidised, or lacks sufficient organic nitrile and more should be added together with a little copper to remove the blue colour. A careful monitoring to assure acidity is desirable for solutions originally low in acid (ca. $pH_2$). It is desirable to exclude oxygen as much as possible, because it oxidises cuprous salts and generates base and cupricion. This, together with the fact that many of the nitriles are volatile, toxic and inflammable, makes it desirable to operate in sealed reaction vessels whenever possible. Reaction vessels should be resistant to the solutions. Lead, glass, and PVC are some of the suitable materials for reaction vessels.

If finely divided materials containing copper plus impurities are used to prepare the cuprous solutions by this method, we have found that readily oxidisable materials, such as iron, nickel, tin, arsenic, cadmium and zinc, which are commonly present in impure copper, also reduce the cupric sulphate under the reaction conditions and themselves dissolve, presumably as sulphates. Other materials, such as gold, lead, silica, carbonaceous material, and to a large extent antimony, bismuth and silver, which are commonly found in impure copper, were found not to dissolve in the electrolyte under the reaction conditions. To a certain extent, cuprous oxide and copper sulphides associated with the copper, dissolve in some compositions to give cuprous sulphate solutions as outlined for following reactions.

A process of forming cuprous sulphate solutions from materials containing copper has been described. It is now obvious to those skilled in chemistry that we are dealing with the chemistry of $Cu^{2+}$, $Cu^+$ and $Cu$, so that some other cupric salts of inert non-complexing anions, e.g. $Cu(ClO_4)_2$ (hazardous) and $Cu(NO_3)_2$ (at controlled pH), other than cupric sulphate, could be used, even if only in a restricted way, to generate certain cuprous salt solutions from copper in the nitrile-water mixtures. However we believe that sulphates are the most suitable salts for the process, particularly for economic reasons. The question of suitable salts is considered in more detail below, but nitrates in solutions which are less than 0.3, more preferably less than 0.2 molar in $H^+$ are next preferred to sulphates for reaction 1.

A modification of reaction 1 is reaction 2 in which less than stoichiometric amounts of cupric salt are used as reagent, but cupric salt is regenerated by the action of oxygen on the product cuprous salt in acidified solution. The regenerated cupric salt converts more copper to cuprous salt. The next result is a reaction which appears to be the reaction of copper with sulphuric acid in the presence of oxygen, with cupric salt as catalyst.

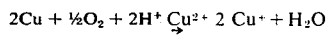

The rate of supply and the pressure of oxygen or air is preferably controlled so that excess oxygen does not oxidise more cuprous to cupric sulphate than is required by the stoichiometry of the reaction shown. Thus cuprous solutions are generated.

The method of dissolving copper is as before, but preferably at lower temperature, (20°–30°C) with provision for good mixing of air with the composition and solids, and for admission of air and acid, as oxygen and acid are consumed. The composition contains less, preferably 1–20% of the concentration of cupric sulphate required by the stoichiometry of reaction 1.

The oxidising method has the disadvantage that acid is consumed and it is slow except when the oxygen or air is under pressure, but it is a very useful way of initiating both reaction 1 and subsequent copper powder refining or copper powder electrorefining processes, especially if supplies of cupric sulphate are not available for starting the process. If operated to a limited extent it helps to control copper concentrations in copper powder refining and copper powder electrorefining.

METHODS OF PRODUCING SOLUTIONS OF CUPROUS FROM CUPRIC SALTS USING REDUCING AGENTS (REACTIONS 5–9 AND 12)

Cupric salts are conventionally reduced (cf. Butts) to copper in aqueous solution by processes known as cementation (e.g. with iron) or precipitation (e.g. with hydrogen). Reduction with $SO_2$ in water is inefficient and requires extreme conditions of temperature and pressure. Cement copper is usually a very crude material, heavily contaminated with iron and well oxidised. Cementation with nickel or cadmium for example is used to purify solutions of their metal salts which are contaminated with cupric salts.

Our new methods of reducing cupric to cuprous solutions in acidic mixtures of water with organic nitriles have no direct precedent, to our knowledge. They have the advantage that they produce solutions which are suitable for thermal or electrochemical disproportionation. In some cases they also provide new leaching methods.

REACTIONS 7 and 8

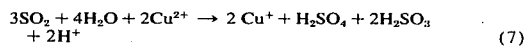

Stable solutions of cuprous salts may be prepared by the following method in which cupric salts are reduced with the appropriate proportion of iron, zinc, nickel, tin or cadmium, or with sulphur dioxide or sodium metabisulphite, in aqueous solutions containing an organic nitrile. Iron and $SO_2$ at normal temperature and pressure are the prefered reductants, but in the case of $SO_2$, the solution should be maintained at a sufficiently low acidity for efficient reduction and formation of soluble $CuHSO_3$ rather than insoluble $Cu_2SO_3$. This can be achieved by having buffers such as basic copper salts, calcium carbonate or ammonium acetate present or by using sodium metabisulphite or by reducing cupric ammonium complex salts with excess $SO_2$.

One advantage of the methods is that solutions for thermal disproportionation are produced. With solid reductants, such as iron and nickel, the reduction is faster than cementation of cupric solutions in water, because a protective layer of copper is not formed on the solid reductant. Reduction with nickel is particularly effective.

The reactions are illustrated by the best method known to us for preparing cuprous from cupric sulphate solutions by reduction, on a laboratory scale.

To an aqueous solution of cupric sulphate containing a little sulphuric acid is added sufficient of a suitable organic nitrile. If cupric sulphate precipitates on addition of the nitrile it will redissolve as reduction proceeds and cuprous sulphate solution is formed. The solution is stirred or shaken with a suitable reducing agent in the proportion of one equivalent of reducing agent per mole of cupric sulphate for those reducing agents (e.g. iron, zinc, nickel or cadmium) which would produce cement copper if present in higher proportions. For less powerful reducing agents, e.g. $SO_2$, at atmospheric pressure and temperature, which will reduce cupric sulphate to cuprous salts but not cuprous salts to copper, an excess of reducing agent may be used. It is desirable to remove the acid, e.g. by having sufficient of a weak base (e.g. CaCO₃ or ammonium acetate) present to complete the reduction, when SO₂ is the reductant. Alternatively, reduction of cupric sulphate to cuprous salts by SO₂ proceeds tolerably at moderate pressures (e.g. 5 atmospheres) and temperatures (of 50°–100°C) in the absence of bases, at an initial pH of between 2–6, in the nitrile-water mixtures.

The reduction is complete when the blue colour of cupric sulphate has disappeared, consistent with any colour of the reducing agent or its oxidation product. e.g. cuprous bisulphite is yellow in the composition and NiSO₄ is green.

Rates of reduction increase with increasing temperature, but an upper limit is imposed by hydrolysis of the nitrile (significant at 75°C) and the volatility of the nitrile (e.g. acetonitrile-water azeotrope at 78°C).

If the reducing agent (e.g. iron, zinc, cadmium or nickel) is a solid, the reduction is faster the more finely divided the solid and the more efficient the stirring or shaking. Solids of minus 16 mesh are preferred in well stirred solutions. However even with bulky iron (e.g. iron nails) the reduction is much faster than is aqueous cementation with the same reductant. If the reducing agent (e.g. SO₂) in a gas, reaction is faster and more efficient under increased pressure and lower pH values are possible, but the advantage of simply bubbling the reductant through a buffered solution at atmospheric pressure, makes this the preferred method, on a laboratory scale, when the reductant is SO₂.

Precautions against volatile, toxic and inflammable nitriles are desirable, so that equipment should be sealed wherever possible, or should include condensers. The oxidation products of the reductants, e.g. FeSO₄, H₂SO₄, NiSO₄, build up in the solution and may have to be removed from the cuprous solution, depending on the subsequent application of the solution. Removal can be done by known and conventional methods, e.g. of precipitation, neutralization, ion-exchange, etc., to the extent demanded by the subsequent process and the purity of copper required.

The processes are illustrated in detail by the examples given later.

The reduction reactions 8 can be utilized in the following new methods for producing copper from cupric sulphate and for leaching nickel, cadmium or cobalt values from materials containing one or more of these metals.

The conventional process most closely related to the new methods is cementation of aqueous cupric sulphate solutions with nickel, cadmium or cobalt to give copper and solutions of NiSO₄, CdSO₄ or CoSO₄. This cementation is difficult with many forms of nickel and requires specially precipitated or sponge nickel. It also suffers from the disadvantage that the cementing agent becomes coated with copper powder, so that cementation is slowed and reduced in efficiency. The new methods provide a much faster method of dissolving up the metals and of reducing the cupric solution.

The method is based on a combination of the reduction reactions 8 and the processes of thermal disproportionation of cuprous sulphate solutions. The preferred form of the process is summarized in the following reaction sequence and if more than 20% by volume of organic nitrile is present, is particularly suitable for the treatment of high grade mattes containing nickel and copper which are of low sulphur content. In such cases those parts of the matte which are metal sulphides are oxidised to sulphur and the cupric sulphate is reduced to cuprous sulphate.

An excess of cupric sulphate dissolved in weakly acidified water-sulphuric acid, plus sufficient of a suitable volatile organic nitrile, preferably acetonitrile, to stabilize the eventual proportion of Cu₂SO₄ is agitated with preferably finely divided (−16+240 mesh) material containing nickel and/or cobalt and/or cadmium (M). Sufficient cupric sulphate is present to maintain some cupric ion in solution at completion of reaction. The leaching and subsequent steps, as far as possible, are preferably carried out in sealed vessels at elevated temperatures (ca. 40°–65°C) in the absence of oxygen. The cuprous salt solution is separated from solids and is thermally disporportionated, as herein described, to give copper, and solutions of cupric sulphate and the other metal sulphates. Th solutions are reconstituted, preferably with distilled nitrile, and more cupric sulphate is added. This solution is recycled with fresh material containing nickel, and/or cobalt, and/or cadmium until a stage is reached after n cycles, where the nitrile-depleted solution from the thermal disproportionation contains $nMSO_4 + CuSO_4$.

A preferable procedure then is to add sufficient powdered active metal M (e.g. sponge nickel) to the nitrile depleted solution of $nMSO_4 + CuSO_4$ to cement the copper, as in conventional aqueous cementation of cupric sulphate by cadmium, nickel or cobalt. The resulting solution of $(n+1)MSO_4$ in an almost aqueous medium is suitable for processing to recover M. Alternatively, cupric sulphide can be precipitated by treating the solution with H₂S for M = Ni or Co, or Cd in strong acid solutions to remove copper.

As in reaction 2, which is a modification of reaction 1, an alternative but slower preferred procedure is to carry out the leaching step in the presence of less than the stoichiometric two moles of cupric sulphate, per mole of metal M, but to admit sufficient oxygen and sulphuric acid to the composition to regenerate cupric from cuprous sulphate, so that the cupric sulphate is effectively a catalyst and the reaction becomes $$M + 2H^+ + \tfrac{1}{2}O_2 \xrightarrow{Cu^{2+}} M^{2+} + H_2O \tag{14}$$

A concentration of between 0.5 – 4% cupric ion is preferred, but if copper metal is with M, then less cupric sulphate can be used. At appropriate stages of the leach, the solution contains $M^{2+}$ and $Cu^{2+}$ sulphates, the oxygen supply is cut off and more M is added to reduce the $Cu^{2+}$ to cuprous sulphate. This is thermally disproportionated to give copper and cupric sulphate. The copper is filtered off. The solutions are reconstituted and the leach continues, with the cupric concentration halved. Thus control of the copper content during leaching can be achieved.

Leaching reaction     $X_i + M + 2CuSO_4 \rightarrow MSO_4 + Cu_2SO_4$
Solid liquid separation
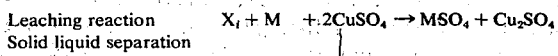

$X_f \quad MSO_4 + Cu_2SO_4$

Thermal disproportionation

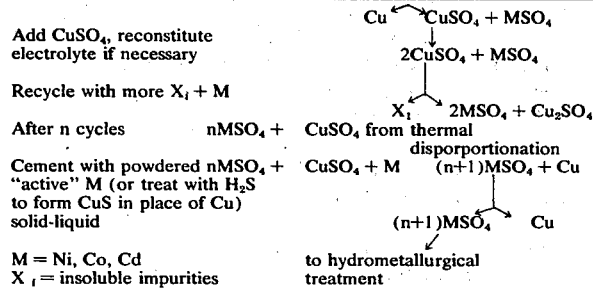

| Add CuSO₄, reconstitute electrolyte if necessary | |
|---|---|
| Recycle with more X$_i$ + M | |
| After n cycles    nMSO₄ + | CuSO₄ from thermal disporportionation |
| Cement with powdered nMSO₄ + "active" M (or treat with H₂S to form CuS in place of Cu) solid-liquid | CuSO₄ + M    (n+1)MSO₄ + Cu |
| M = Ni, Co, Cd X$_i$ = insoluble impurities | to hydrometallurgical treatment |

(The reaction sequence for obtaining copper from cupric sulphate and for leaching nickel, cobalt, sulphates (cadmium) from the metals in a non-oxidising atmosphere illustrates a preferred method, using compositions and reactions already described).

A modification of the reduction of cupric salts to cuprous salts by $SO_2$ provides a new method for extracting cuprous salts from basic oxidised copper, e.g. CuO, Tenorite, Malachite, Azurite, and Chrysocolla, using reaction 12, with sulphur dioxide in water containing sufficient of a suitable organic nitrile. Conventionally (cf. Butts) oxidised ores are leached with sulphuric acid and copper is cemented with iron or is electrowon from the cupric solution. Such methods are costly and inefficient. In the new process, cheap $SO_2$ acts as a reducing agent for $Cu^{2+}$ and produces acid, which is consumed by leaching the basic copper, so that the process continues. The reactions take place at atmospheric pressure and at normal temperatures and are believed to be represented by the following equations, which use CuO as an example of basic oxidised copper, $$3CuO + 3SO_2 + H_2O \rightarrow 2CuHSO_3 + CuSO_4 \qquad (12)$$

The method consists of mixing the basic oxidised copper in an atmosphere of sulphur dioxide with a composition composed of sufficient of a suitable organic nitrile and water, preferably in a leaching vessel, which is sealed, and leaching by conventional leaching methods for extracting copper values from materials containing copper with solid, liquid and gaseous reactants.

The solution of $CuHSO_3$ and $CuSO_4$ is separated from solids, then copper is recovered for example by thermal disproportionation. Under some conditions, cuprous sulphite is precipitated with the copper, but if washed with dilute aqueous sulphuric acid, this disproportionates to copper and cupric salt solutions so that copper can be separated. Sulphur dioxide reduction is also possible to give a homogenous solution if the copper ammonium salt solutions from an ammoniacal leach, e.g. of copper sulphides, are mixed with an organic nitrile and the solution is saturated with sulphur dioxide until the blue colour disappears.

Another method of producing cuprous solutions and of leaching copper values from cupric sulphide or materials containing cupric sulphide uses reaction 5, or 6, in which cupric sulphate is thought to be reduced by sulphide ion, or hydrogen sulphide, which is in equilibrium with cupric sulphide in acid solutions containing water and sufficient of a suitable organic nitrile. The reaction is similar to the reduction of ferric salts in aqueous solution by cupric sulphide, with production of sulphur, except that here, cupric salts are reduced. The reactions proceed at useful rates at elevated temperatures and are believed to be represented by the following equilibria, although cuprous ions may react with sulphur to give cuprous sulphide, not cupric sulphide in the reverse reactions

$$CuS + Cu^{2+} \rightleftharpoons 2Cu^+ + S \qquad (5)$$

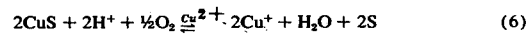
$$2CuS + 2H^+ + \tfrac{1}{2}O_2 \rightleftharpoons 2Cu^+ + H_2O + 2S \qquad (6)$$

Both cuprous salt solutions and sulphur were isolated, but other oxidation products of sulphur and cupric ions may also be formed, especially if oxygen is used under pressure in reaction 6.

A preferred method for preparing cuprous solutions by reaction 5 uses conventional solid-liquid leaching procedures in sealed systems at elevated temperatures, with finely divided (−100 mesh) cupric sulphide, and an excess of $CuSO_4$ in 5 to 10% by volume of $H_2SO_4$, water and between 35 – 60% by volume of a suitable nitrile at 50° – 70°C in a non-oxidising atmosphere. Too much $CuSO_4$ leads to separation of nitrile and water, so it is sometimes useful to add $CuSO_4$ as reaction proceeds. Reaction is continued until the copper concentration reaches a steady value. The cuprous sulphate solution is separated from sulphur and other solids, including unleached material, and is stored in a sealed vessel and the leach is continued with fresh cupric sulphate solution. Preferred nitriles are acetonitrile and 2-hydroxycyanoethane.

A modification of this method is reaction 6, where the preferred procedure is much the same, except that less than the stoichiometric amount of cupric sulphate is used, and oxygen is admitted to regenerate cupric ions from cuprous ions. Provision is made to add more acid and oxygen as reaction proceeds, but the supply of oxygen is preferably controlled so that the stoichiometry of equation 6 is preserved and a final solution of cuprous sulphate, rather than cupric sulphate, is formed. As in reaction 2, the cupric sulphate is a catalyst and preferably between 1 – 20% of that required by the stoichiometry of equation 5 is used. Good mixing of the solid, liquid and gas phase is highly desirable. It is believed that reaction 6 may not be the only representation of reactions giving copper in solution by this method. Some oxidation of sulphide by oxygen to other sulphur species and of $Cu^+$ to $Cu^{2+}$ may take place, especially with oxygen under pressure.

The oxidising method has the disadvantage that acid is consumed, but is useful when adequate supplies of cupric sulphate are not available and equilibrium can be forced further to the right as cuprous ions are oxidised. Further notes on reactions 5 and 6 are included with the discussion of reaction 3 and 4.

Reduction with silver provides a method both for leaching silver from materials containing silver and for reducing cupric to cuprous salt solutions. The silver can readily be recovered as illustrated later. The method uses reaction 9. The equilibrium requires a relatively high proportion of organic nitrile in the water if it is to proceed to a useful extent to the right. A mixture of 0.05M cuprous and silver sulphates in solutions low in acetonitrile (ca. 20% by volume) is rapidly converted to cupric sulphate and silver by the reverse reaction.

In the preferred method, finely divided silver (−16 mesh) or finely divided materials containing silver, such as dore metal, lead-silver mixtures and cement silver, are shaken with an excess of cupric sulphate or cupric nitrate in a solution preferably 35 to 60% by volume acetonitrile, and acidified water. In the case of cupric nitrate, the acidity should be kept low (<0.2M in H$^+$) to prevent nitric acid oxidising cuprous ion. Shaking is continued until the silver content of the solution reaches a constant value or is done in more than one extraction with fresh cupric salt, if optimum extraction is desired. The resulting solution is filtered to remove solids to give a mixture of silver, cuprous and cupric salts. As with most solid-liquid reactions, reaction 9 is faster at elevated temperatures, with more finely divided material containing silver and with more effective agitation. Reduction of the cupric solution is effective at room temperature in well stirred solutions, with most silver-containing materials, between minus 16 plus 240 mesh.

Oxidation by silver cations (reaction 13)

Particulate copper is stirred with an equimolar proportion of a suitable silver salt, preferably silver sulphate, in sufficient of a suitable organic nitrile, and acidified water. Silver is cemented and a colourless cuprous salt solution is produced.

Acid-base reactions (reaction 10)

$Cu_2O + 2H^+ \rightarrow 2Cu^+ + H_2O$.

Cuprous oxide dissolves in aqueous sulphuric acid to give cupric sulphate, but an equal amount of copper is also formed, presumably because any cuprous sulphate formed, immediately disproportionates in water. We believe that stable cuprous sulphate solutions have not been prepared by this method in purely aqueous solvents.

Cuprous sulphate or bisulphate solutions, suitable for cuprous winning, cuprous electrowinning, powder electrorefining, and cuprous electrorefining may be prepared by a new method, a preferred form of which follows. The reaction provides an excellent method of "pickling" i.e., of removing cuprous oxide films from case copper or hot rolled or copper rod, to give a material which is free of copper powder and thus more suitable for wire drawing, unlike copper pickled in aqueous sulphuric acid. The solvent is prepared by mixing water with at least sufficient of a suitable organic nitrile to stabilize the eventual concentration of cuprous salt. Sufficient sulphuric acid to satisfy the stoichiometry of the above equation and to provide at least a slight excess of acid, is added carefully with stirring, and the cuprous oxide, is stirred or shaken with the acidic solvent, preferably in a non-oxidising atmosphere in a reaction vessel. On a large scale, the conventional leaching methods for reaction of sulphuric acid with oxidised copper (cf. Butts loc. cit.) could be used, except that steps should be taken to contain volatile, toxic and inflammable nitriles and to minimise oxidation, so that sealed leaching vessels are preferred. The solution is separated from any solids and concentrated or diluted if necessary, to provide desired compositions. It is stored in sealed vessels, in a non-oxidising atmosphere.

In "cuprous pickling" the oxidised copper is washed in the acidified water containing the organic nitrile and is then preferably washed in a conventional aqueous pickling bath.

The resulting solution should be colourless or very pale blue, but if it is significantly blue it is preferably decolourised by addition of a little copper powder. If the blue colour persists or returns, more organic nitrile can be added. The rate of dissolution of the cuprous oxide is enhanced by efficient stirring and by having finely divided solids. It is greater at higher temperatures, but an economic upper limit is imposed by hydrolysis of the nitrile in the highly acidic solution. A preferred temperature range is 30° – 50°C.

The reaction has been extended to ores such as cuprite and materials containing basic cuprous salts other than cuprous oxide, e.g. CuOH, $Cu_2CO_3$ and basic cuprous sulphate.

Dissolution of cuprous sulphide (reaction 11) — $Cu_2S + 2H^+ \rightarrow 2Cu^+ + H_2S$.

Cuprous sulphide is insoluble in aqueous sulphuric acid but is soluble in freshly acidified dry acetonitrile. This reaction has more limited application than the dissolution of cuprous oxide, because it is carried out in anhydrous acetonitrile rather than in water-nitrile mixtures and the acetonitrile is sometimes polymerised by the anhydrous acid. It is best suited to small scale reactions.

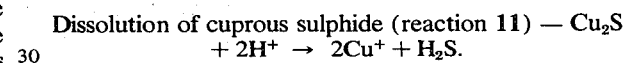

Differential precipitation — exchange of cupric and cuprous sulphides (reactions 3 and 4)

The reaction initially is thought to be as in reaction 3 and provides a new method of leaching copper values from materials containing cuprous and sulphide ions and of preparing cuprous solutions.

Solutions of cuprous sulphate, suitable for thermal or electrochemical disproportionation, may be prepared by this reaction. The reaction occurs also to varying extents with copper mattes, chalcocite, bornite and related materials containing cuprous ions and sulphide ions. It is very slow and inefficient with chalcopyrite and pretreatment of chalcopyrite, e.g. with sulphur, is necessary for a satisfactory leach.

Cuprous sulphide has a much lower solubility product than cupric sulphide in acidified water, so that the equilibrium shown lies to the left in water. Thus cupric sulphate will not generate solutions containing significant amounts of cuprous sulphate when added to cuprous sulphide suspended in acidified water.

We have found that in water containing sufficient (preferably 30 – 60% by volume) of suitable organic nitriles in moderately strong sulphuric acid, equilibrium is rapidly established even at room temperature, such that significant amounts of cuprous sulphate or bisulphate are produced. Indeed more copper ions are generated in solution than is expected from the stoichiometry of the above equation when cuprous sulphide is heated at 50° with excess cupric sulphate containing 10% by volume sulphuric acid in 50% by volume acetonitrile and water. It is thought that the aforementioned redox reaction (5) to produce sulphur, also takes place in the acidified aqueous nitrile solution during the reaction and that this increases the concentration of cuprous ions above that expected from the stoichiometry of the primary reaction. Thus cuprous sulphide and related materials can be oxidised to sulphur and solutions of cuprous sulphate by the combined equilibria 3 and 5.

Reaction rates are enhanced by having finely divided material (e.g. −100 mesh) containing cuprous sulphide, by having high concentrations of sulphuric acid, by having well stirred solutions and elevated temperatures and by having increased proportions of nitrile. Hydrolysis of the nitrile imposes economic limitations on the strength of acid and the temperature chosen. A preferred method of carrying out reaction 3, followed in part by reaction 5, is as follows:

Finely divided cuprous sulphide (about −100 mesh) or materials containing cuprous ions and sulphide ions, such as copper matte, bornite, chalcocite, djurleite and digenite are well stirred or shaken, preferably at 50° − 70°C in a sealed vessel in the absence of oxygen with an excess of cupric sulphate in a solvent consisting preferably of 30 − 60% by volume but not less than 20% by volume of a suitable nitrile (preferably acetonitrile or 2-hydroxy cyanoethane), water, and sufficient sulphuric acid to give an acceptable rate of formation of cuprous solution, but not so much that hydrolysis of the nitrile at the necessarily elevated temperatures is economically unacceptable. We prefer between 5 and 10% sulphuric acid by volume. The process is continued until the copper in solution approaches a steady value (i.e., complete leaching or equilibrium). The total volume of solvent should be sufficient to dissolve the final concentration of cuprous sulphate or bisulphate. We find, for example, that a solution containing 100 gms of $Cu^+$/liter, presumably as sulphate or bisulphate, in acidified 50% acetonitrile-water at 50°C is homogeneous. It is not essential that all the cupric sulphate be dissolved during the initial stages of the exchange reaction but if too much is present, the solution separates into two layers, so addition of $CuSO_4$ as reaction proceeds is preferred. After completion of reaction, the solution is filtered free of cupric sulphide, sulphur and other solids and is stored in a sealed vessel in a non-oxidising atmosphere. Higher yields are obtained if the solids are repeatedly leached with fresh cupric sulphate solution, because reaction 3 is an equilibrium.

An alternative procedure is to carry out reaction 3 as specified, but in the presence of oxygen or air at 1 atmosphere or above, and preferably less than the stoichiometric amount of cupric sulphate, with provision for the addition of more acid as required. The oxygen slowly oxidises the product cuprous sulphate to cupric sulphate so that the cupric sulphate is effectively a catalyst and reaction 3 becomes 4. The amount of oxygen or air preferably is controlled at various stages of the leach so that cuprous, rather than cupric sulphate is formed, in accord with the stoichiometry of reaction 4.

The preferable amount of cupric sulphate used is such that it is more than 0.5% by weight $Cu^{2+}$ for most of the leaching process, because lower concentrations lead to slower reactions. Reaction is preferably continued until the concentration of copper in solution approaches a steady value. The solution is filtered free of cupric sulphide and other solids and is stored in a sealed vessel in a non-oxidising atmosphere.

It is desirable to have good mixing between the solid, liquid and gas phases and the cuprous sulphide materials should be finely divided, preferably −100 mesh.

As noted, reaction 5 and 6 are often consecutive with reactions 3 and 4, to consume CuS and generate more copper in solution, and further notes on the combined equilibria, which is effectively the redox reaction, $Cu_2S + 2Cu^{2+} \rightleftharpoons 4Cu^+ + S$, follow.

Further notes on Equilibria 3 and 5 and the combined reactions

The following reactions represent equilibria which are strongly influenced by the proportion of organic nitrile present in partly aqueous acidified solutions.

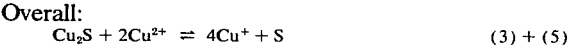

In purely aqueous solution the equilibria lie so far to the left that the reactions are of no value for leaching copper values from materials containing copper and sulphur ions, but in the presence of sufficient of a suitable organic nitrile in acidified solution, the reactions proceed at a convenient rate and lie sufficiently to the right so that copper values can be extracted from many materials containing copper and sulphur ions, such as bornite, chalcocite, copper matte, cupric sulphide and digenite.

The relation between the equilibrium constants for the overall reaction and the proportion of nitrile is such that a proportion of between 30–60% by volume of acetonitrile is a preferred part of the composition from the thermodynamic viewpoint. Acid appears to lead to a faster reaction, as do elevated temperatures. In low proportions of acetonitrile, equilibrium is established less rapidly, so kinetic aspects are important. More copper is extracted if cuprous ion is removed as it is formed, e.g. by thermal or electrochemical disproportionation of the cuprous solution, or by its oxidation to cupric ion. Alternatively, sulphur is removed, e.g. by adsorption, chemical reaction or solvent extraction. A preferred method of operation is cuprous leaching, i.e., to continuously remove the pregnant leach liquor, separate precipitated sulphur by filtration, then remove the dissolved sulphur by a chemical reaction, e.g. with a little copper powder, then disproportionate the cuprous ion in the leach liquor, returning the cupric salt in acidified nitrile-water to the reaction vessel for further leaching.

An alternative for the combined reaction is to oxidise the cuprous ion with air as it forms, when the reaction becomes effectively a leach of copper sulphides by sulphuric acid and oxygen, catalysed by cupric ions as shown in the equations

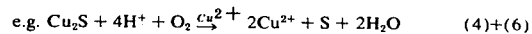

In these circumstances the reaction proceeds to completion.

In practice, reactions 4 and 6 are slower than reactions 3 or 5 respectively, so that some cupric sulphide is formed and the first 50% of copper available from cuprous sulphide is leached more rapidly than the final 50%.

The combined reactions are not suitable for efficient leaching of chalcopyrite, but if the chalcopyrite is pretreated, for example by heating it with sulphur in a sealed vessel for several hours at 400°–500°C, then a leachable form of copper sulphide and a virtually non leachable iron sulphide is formed.

Processing of silver via cuprous salts

Preferred methods for separating silver and copper from materials containing silver and copper and for extracting and purifying silver materials containing silver, but no copper, are summarized in FIG. 7. The methods follow directly from the inventive concepts of reactions 1, 9 and 13 and of thermal disproportionation of cuprous salts, in nitrile-water mixture, as covered by this application. The methods are well suited to treatment of Dore metal, silver-lead-copper mixtures, and cement silver e.g. as obtained from the refining and smelting of non-ferrous base metals.

Silver at present is extracted and purified in a number of ways, including cyanidation, roasting and leaching, by cupellation, by melting with zinc or by electrorefining. These methods either consume chemicals or require equipment of relatively high capital cost. The new method is cheap and simple and has the advantage that extraction and formation of copper powder is a concurrent process. The preferred method follows from FIG. 7 which merely illustrates the sequence of steps and involves a combination of reactions whose procedure is discussed elsewhere in this application, several solid-liquid separations and two thermal disproportionation steps, as herein described, thus a volatile nitrile is necessary and we illustrate this by discussing acetonitrile.

FIG. 7 is a form of flow sheet in which the numerals refer to the following: 1 — a source of particulate material containing copper, silver and impurities e.g. lead, gold and iron, 2 — a solution of cupric sulphate, water, sulphuric acid and less than 35% by volume, preferably 15–25% by volume of a volatile organic nitrile, 3 — a leaching vessel for reaction 1, 4 — separation of solids and liquids, 5 — a solution of cuprous sulphate plus soluble impurities, 6 — solid materials containing silver, 7 — a solution of cupric sulphate, water, sulphuric acid and more than 35% by volume of a volatile organic nitrile, 8 — a solution of cuprous sulphate and silver sulphate, 9 — insoluble impurities e.g. lead, silica, 10 — system for cementing silver with particulate copper, 11 — metallic silver, 12 — a solution of cuprous sulphate, 13 — an apparatus for thermal disproportionation of cuprous sulphate solutions, 14 — removal of nitrile distillate and condensation, 15 — cupric sulphate in a nitrile depleted solution, 16 — copper powder, 17 — system for purifying electrolyte solution and adjusting its composition, 18 — removal of soluble impurities removed from the electrolyte in 17, 19 — system for washing silver with part of the solution numbered as 2 using solution bled off from 2.

The key feature of the preferred method is that copper in finely divided materials containing copper, 1 in FIG. 7 is oxidised by certain cupric salts in acidified mixtures, 2, of water containing less than 35 % acetonitrile by volume (i.e., reaction 1), whereas a rapidly decreasing proportion of silver is oxidised as the proportion of acetonitrile in the composition decreases (i.e., reaction 9). Thus a composition, preferably saturated, but not excluding suspensions of certain cupric salts, acidified water, preferably 15 to 25% by volume and necessarily less than 35% by volume acetonitrile extracts copper, but very little silver, from a mixture containing copper and silver. In compositions containing more than 35% by volume acetonitrile, acidified water and preferably saturated with, but not excluding suspensions of, cupric salt, an increasproportion of silver is oxidised by $Cu^{2+}$ with increasing proportions of acetonitrile, once all the copper has been dissolved. Thus, in the preferred procedure, once copper has been leached from a copper-silver mixture with a composition containing ca. 15 to 25% acetonitrile by volume, as described and shown to point 6 in FIG. 7, silver is leached separately with a composition, 7, of excess cupric salt, acidified water, and preferably 35–60% by volume acetonitrile. The resulting $Cu^{2+}$, $Cu^+$, $Ag^+$ solution is cemented, 10, with the appropriate proportion of copper powder to give silver. The cement silver is washed free of copper, step 19, with a dilute solution of cupric salt preferably in 15 to 25% acetonitrile-acidified water. The thermal disproportionation steps shown as in 13 in FIG. 7 are as described previously.

Preferred salts are cupric sulphate in solutions acidified with sulphuric acid preferably at least 0.5% and more, preferably 2 to 5% by volume, or cupric nitrate, acidified with preferably <0.2 molar nitric acid. Higher concentrations of nitric acid cause oxidation of copper. Nitrates tend to be more soluble than sulphates, but sulphates are cheaper. Lead sulphates are insoluble whereas lead nitrate is much more soluble, which is a disadvantage for nitrates.

A preferred method for materials containing silver, but no copper, is to leach directly with a composition of excess cupric salt, acidified water and more than 35%, most preferably 45 to 60% by volume acetonitrile and continue the process as shown following $Ag + X_i$ in FIG. 7. In estimating the amount of cupric salt required for this process, it should be remembered that many other reducing agents, Fe, Ni, Cd, Zn, but not lead, in the presence of sulphates, reduce $Cu^{2+}$ more readily than does silver in nitrile-water mixtures. The presence of such species in the material containing silver and copper requires an appropriate proportion of cupric salt.

Suitable and preferred materials for thermal and electrochemical disproportionation, and for reactions 1–13.

The following expressions have been used in this application and are now explained.

Suitable Organic Nitriles

Acetonitrile, 2-hydroxycyanoethane and acrylonitrile are suitable organic nitriles and are preferred with the reservations as to their volatility, stability and homogeneity of compositions noted for certain processes. Throughout the description and claims of this application we have referred to "organic nitriles," "acrylonitrile" and "propionitrile" while recognising that many organic nitriles, including acrylonitrile and propionitrile, are not miscible in all proportions with water. Most of our compositions and methods require homogenous solutions, so that it is to be understood that where necessary for homogeneity, the terms organic nitrile, propionitrile, and acrylonitrile include mixtures of these species with sufficient of a solubilizing agent, such as ethanol, to ensure homogeneity. The terms "organic nitrile" and "volatile organic nitrile" include mixtures of organic nitriles and of volatile organic nitriles respectively.

Whether a nitrile other than acetonitrile, 2-hydroxycyanoethane, or acrylonitrile with solubilizing agent, is suitable or not for the purposes of this invention is decided by the following tests. Our use of the terms "organic nitrile", "nitriles", "volatile organic nitrile" and so on in the application refers only to those species of the general formula RCN which pass the following tests and to acetonitrile, acrylonitrile, propionitrile

GENERAL TESTS FOR NITRILES 1. (5 × MWt)/13 gm of the nitrile under test is stirred with 65 gm of water containing 5 ml of sulphuric acid. The stoppered solution should remain homogeneous over a period of one hour at 50°C.

1a. If the solution is not homogeneous, up to 30 ml of ethanol is added. The stoppered solution should remain homogeneous for one hour at 50°C. If homogeneous solutions cannot be prepared by these procedures then the nitrile is deemed unsuitable.

2. To the homogeneous solutions, prepared either as in 1 or 1a, there is added 4 gm of $CuSo_4 \cdot 5H_2O$ and this is stirred with 2 gm of copper powder (minus 100 mesh) for 1 hour at 50°C. If the solution is still homogeneous, except for undissolved copper powder and has become colourless, very pale blue, or coloured with due regard for any coloured nitriles, then the nitrile has passed this test.

3. The successful solutions from test 2 are flushed with nitrogen, stoppered and warmed at 50° for 24 hr. If the solution is still homogeneous and colourless or very pale blue or coloured with due regard for any coloured nitriles and contains more than 1 × $10^4$ ppm of copper by atomic absorption, then the nitrile has passed this test.

SPECIFIC TESTS FOR NITRILES

Whether the nitrile is suitable for thermal disproportionation, e.g. as in winning or copper powder refining is further decided by its volatility.

4. The solutions from successful tests 3 are slowly distilled through an efficient distillation column. In some cases the distillation is of a water-nitrile, in others, e.g. propionitrile, of an ethanol-nitrile azeotrope. If more than 75% of the nitrile can be distilled off below 90°C, as measured for example by vpc of the distillate, and if some copper powder is precipitated on complete removal of the nitrile, then the nitrile is deemed suitable for thermal disproportionation.

Nitriles which pass tests 1–3, but which cannot be distilled below 90°C in test 4, are deemed suitable only for electrochemical disproportionation methods. The nitriles of test 4, which distil below 90° are defined as volatile and are suitable for methods of electrochemical and thermal disproportionation. Electrochemical disproportionation with a volatile nitrile was done on a laboratory scale by operating even at 50° with an electrolyte containing 25% acetonitrile by volume under a layer of paraffin, and also by operating at about 20°C with acetonitrile in cells covered with plastic sheets, enclosing an atmosphere of nitrogen.

The following nitriles were tested and found not suitable, dicyanomethane, acetone cyanhydrin, hydroxy cyanomethane, phenylcyanomethane. In general terms, suitable organic nitriles are organic nitriles, (including if necessary an "inert" solubilizing agent) which when mixed with water and sulphuric acid maintain stable homogeneous solutions of cuprous sulphate, all components being in proportions suitable for the particular process. Commercially, a desirable attribute is that the nitrile should not decompose to an economical unacceptable extent under the conditions of reactions 1–13 or thermal or electrochemical disproportionation. For example, a nitrile possessing some other functional group (e.g. CHO) which was readily oxidised or reduced, might be unsuitable for cuprous winning or for the electrochemical processes. Other nitriles might be hydrolysed or polymerised by the aqueous acid solutions at a rate which was uneconomic at elevated temperatures, and thus be unsuitable economically for thermal disproportionation but be suitable for electrochemical disproportionation, which can operate at room temperature and below.

As previously explained, the term suitable organic nitrile includes mixtures of nitriles, for example, acetonitrile containing some acrylonitrile is a mixture offering economic advantages, because such mixtures are by-products from acrylonitrile manufacture. Acrylonitrile however is only partly miscible with water, so small proportions of it, or inclusion in the composition of a suitable solubilizing agent (e.g. methanol) are necessary.

Preferred organic nitriles are volatile acetonitrile and "non-volatile" 2-hydroxycyanoethane and to a lesser extent volatile propionitrile (with methanol or ethanol as a solubilizing agent) and acrylonitrile (with solubilizing agents).

As already noted, according to whether a thermal or an electrochemical disproportionation step is used, further preferences and requirements are necessary. Thus volatile stable acetonitrile is strongly preferred for processes involving thermal disproportionation, such as cuprous winning and copper powder refining, because a distillation step is involved and the water-acetonitrile azeotrope boils below 80°C. On the other hand, slightly less stable but higher boiling 2-hydroxycyanoethane is well suited to electrochemical processes, such as copper powder electrorefining, and cuprous electrowinning, because these electrochemical processes operate preferably at less than 50°C, but are less suited to rigorously sealed systems because of problems with cathode handling. If a sealed system cannot be used, nitriles of low volatility are preferred, e.g. nitriles with solubilizing functional groups (OH, $CO_2H$, $NH_2$). Use of such nitriles does not remove the problem with air oxidation however, so a "blanket" of non-oxidising atmosphere is preferred.

The preference of 2-hydroxycyanoethane for electrochemical processes was made because it had an inert functional group (OH) which conferred water miscibility on the nitrile and produced a nitrile of low volatility. It is also relatively cheap to manufacture. It does give a higher solution resistance than acetonitrile however. Other functional groups (e.g. $SO_3^-$, $CO_2^-$, $-NR_3^+$) are less easy to introduce into organic nitriles, but are suitable in principle, provided that they pass our test of maintaining stable, homogeneous solutions of cuprous salts when mixed with water and suitable acids, all components being in proportions suitable for the particular process being used. For example, cyanoacetic acid does not pass our tests, because it forms a solid with cuprous sulphate, and the cyanohydrin or formaldehyde decomposed rapidly.

Inert solubilizing agents

These are substances designed to produce homogeneous solutions of cuprous salts, acid, water and sufficient of suitable organic nitriles, in proportions suitable for the processes covered by this application. The term solubilizing agent in this application should be understood to refer to inert solubilizing agents.

They are used when the suitable organic nitrile is only partly miscible with water (e.g. with some proportions of propionitrile or acrylonitrile). Solubilizing agents can be tested for as in tests 1a–4 described for determining suitable nitriles, with the solubilizing agent replacing the ethanol in 1a. The solubilizing agent should not drastically alter the electrical resistance of the electrolyte in the electrochemical processes and should be chemically inert or still effective under the conditions of the process. Preferred solubilizing agents are ethanol or methanol. As noted already, in this application, it is to be understood that terms such as "suitable nitrile" or "volatile organic nitrile" mean that the nitrile is accompanied by a solubilizing agent if necessary for homogeneity.

Sufficient of a suitable nitrile

For the handling of solutions of cuprous salts, a nitrile judged suitable by the methods outlined above, must be present in sufficient proportion to stabilize the cuprous ion in water, but since the nitriles are costly, no more nitrile than is necessary for satisfactory operation of the particular process, is desirable.

We have found that in the absence of oxidising agents, e.g. oxygen, stable solutions of some cuprous salts can be prepared in water containing a suitable acid and between 2–3 moles of an organic nitrile per mole of cuprous ion. Oxidation is faster in solutions of low nitrile content (cf. Table 2), so that under normal operating conditions, where it is difficult to completely exclude air, between 5 and 6 moles of suitable nitrile per mole of $Cu^+$ is preferred, if stable solutions are required.

For the thermal disproportionation processes there is little advantage in having more than 6 moles of volatile nitrile per mole of $Cu^+$, because the nitrile must be distilled, but for the electrochemical processes, the efficiency, the quality of the cathodic deposit, the polarization, the operating voltage and the speed of the $Cu^{2+}$ production at the anode, versus $Cu^+$ reduction by reaction 1, are all linked with the concentration of cuprous sulphate and the proportion of nitrile present. Thus, in the electrochemical process, criteria in addition to those for stabilization of cuprous ion determine the proportion of nitrile used. The proportion of nitrile chosen may be greater than the 5–6 moles, per mole of $Cu^+$, specified above. If there is too much nitrile in the electrochemical processes this imposes an unnecessarily high resistance on the electrolyte and hinders disproportionation which creates high operating voltages, so that more than 10 moles of nitrile per mole of $Cu^+$ was seldom used. Electrochemical disproportionation does proceed at attractively low voltages in solutions containing just 3 moles of acetonitrile per mole of cuprous ion but the cathode quality suffers.

For some of the methods used to prepare solutions of cuprous salts higher proportions of nitrile are necessary to force appropriate equilibria sufficiently to the right. It is preferable to adjust the compositions of such cuprous salt solutions, prior to electrochemical or thermal disproportionation, e.g. by adding water, acid, or by quicklydistilling off nitrile.

Thus preferred compositions for reactions 1, 2, 7, 8, 10, 12 and 13 contain about 5–6 moles of nitrile per mole of eventual cuprous ion in solution, but these reactions do proceed with down to 2.5 to 3 moles of nitrile per mole of cuprous ion, in the absence of oxygen or oxidising agents. In practical terms between 8–30% by volume of our preferred nitriles are preferred for these reactions. For the reactions 3 to 6 and 9 of cupric salts with copper sulphides and silver, at least 20% by volume of acetonitrile are required to give detectable amounts of cuprous ion so that aqueous solutions, preferably containing more than 30% v/v acetonitrile were preferred if reactions 3–6 were to proceed at a satisfactory rate and were to leach an acceptable copper value. Reactions 3 to 6 and 9 of course do proceed to some extent with a lower proportion of acetonitrile than 30% by volume and with other nitriles. Relevant data are in later Tables, dealing with reactions 3 to 6 and 9 and clearly the choice of the proportion of nitrile used will depend on a balance between losses of nitrile, the cost of nitrile, the size of the equilibrium constant, the method of disproportionation and the frequency of leaches with fresh cupric salt solution. Such a choice will vary in different situations.

Throughout the description and claims of this application it is to be understood that where the use of an organic nitrile is described or claimed, unless stated otherwise, the amount of nitrile is sufficient to satisfy the requirement outlined above. A further limitation on the amount of nitrile is that it form homogeneous compositions.

Additives

Here we refer to a whole host of additives which are known to improve the quality of copper cathodes (cf Butts) and change the nature of copper powders precipitated from cupric solutions by, for example, hydrogen. As yet, we have not fully tested additives other than thiourea, long chain salts of alkylaryl or alkylsulphonates, ammonium lignin sulphonates, sodium thiosulphate, and glue as part of this invention, but note that additives are desirable in both forms of disproportionation. We believe that any additive which improves cathode quality in "cupric" electrorefining is highly likely to influence cathode quality in electrochemical disproportionation. Alkylsulphonates include ammonium lignin sulphonates in this application and claims. Such additives are also likely to alter the physical properties of the copper powder precipitated in the thermal disproportionation, where discrete particles are highly desirable. In particular we note that copper seeds, 0.1% of sodium alkylaryl sulphonates (AVITONE) sodium thiosulphate, and ammonium lignin sulphonates (ORZAN) produce an improved crystalline precipitate from thermal disproportionation of cuprous salt solutions. Additives are preferred in proportions between 10 and 10,000 ppm.

Suitable reducing agents

Cuprous sulphate or $CuHSO_4$ solutions are produced by reduction of cupric sulphate solutions in the presence of water, sulphuric acid and an organic nitrile. In principle those reagents which are known to reduce cupric ion to copper in water will reduce cupric to cuprous sulphate and often further to copper in the acidified water-nitrile mixture. However solubilites, side reactions and so on, sometimes prevent efficient formation of a suitable cuprous salt solution for the processes outlined in reduction reactions represented by reaction 8.

The following are regarded as suitable reducing agents and the term reducing agent refers to them in this application, unless stated otherwise, because they reduce cupric sulphate to solution of cuprous salts in acidified aqueous solutions containing sufficient acetonitrile to stabilise any cuprous ion (i.e., more than 2.5 moles of nitrile per mole of cuprous ion): iron, nickel, cobalt, copper, cadmium, zinc, tin, sodium metabisulphite, sulphur dioxide and sulphurous acid. Cuprous and cupric sulphide, nickel sulphide and silver are also suitable reductants in the presence of higher proportions of organic nitrile, as already discussed. The proportions of reductant are such as to satisfy the reduction $Cu^{2+} \rightarrow Cu^+$, (e.g. ½ mole of iron reduces one mole of cupric sulphate to cuprous sulphate). A preferred reductant is sulphur dioxide or sulphurous acid at atmospheric pressure in the presence of a weak base and this reductant also reduces cupric carbonates or oxides, as noted for reaction 12, as well as cupric ammonium salts. At moderate temperatures and pressures (5 atmos. and 50° – 100°C) no base is needed provided that the initial activity is low, when $SO_2$ is the reductant.

Copper salts, cupric salts, cuprous sulphate, $CuHSO_4$, certain suitable cuprous salts, and suitable acids In practice, this application deals with sulphates, sulphites, bisulphates, bisulphites and nitrates of copper. The acids are sulphuric, sulphurous or nitric. The solutions described in these processes as containing cuprous sulphate, $CuHSO_4$, cuprous bisulphite, etc, have not had the said suprous salts isolated as solids, nor have the salts been identified, so we use the term a little loosely. However we do know that the solutions contain cuprous ions and can give copper by disproportionation. We use the names for the solutions prepared as described herein because the method of preparation leads us to believe that they would be solutions of such salts. The term "cuprous sulphate" in both the application and claims include the bisulphate, and the $CuHSO_4$ includes the sulphate. In the presence of $SO_2$, other salts, such as $CuHSO_3$ would be present when for example cupric sulphate was reduced. We note that $CuHSO_4$ appears to be a more soluble species than $Cu_2SO_3$. Likewise the reactions, 1 – 13, as represented by the equations, may not proceed exactly as specified by these equations. We have established however that when the reactants shown are mixed under the specified conditions, cuprous salt solutions are produced and that is the requirement of this invention.

Cuprous sulphate solutions containing sulphuric acid are a suitable salt and acid for all thermal and electrochemical disproportionations. Cuprous nitrate and a little nitric acid are suitable for some forms of thermal disproportionation at low acidities. More than 0.3N nitric acid dissolves some of the copper powder which is produced and oxidises cuprous ion. Thus cuprous nitrate solutions are undesirable for the electrochemical processes, for which strongly acid solutions are preferred. Nitrates tend to be more soluble than sulphates (Table 3) and so offer some advantagges for thermal disproportionation in solutions containing less than 0.3 acid. Likewise it is undesirable to use cupric nitrate containing more than 0.3 normal nitric acid to generate solutions of cuprous nitrate, indeed with high nitrate acid content it is impossible.

Cuprous sulphite is not very soluble in nitrile-water mixtures but cuprous bisulphite, or $CuHSO_3$ mixed with $CuHSO_4$ sulphurous acid solutions are suitable for the thermal disproportionation step of some of the processes. "Cupric sulphite" or "bisulphite" is excluded from the copper salts described in this invention. Careful control of pH is needed to obtain solutions of cuprous bisulphite.

Anions which form water insoluble curprous salts and complex with cuprous ion, e.g., $Cl^-$, $CN^-$, $S^=$, $Br^-$ do not allow solutions of cuprous salts of sufficient concentration for satisfactory disproportionation, and their salts are excluded from the "cuprous salt solutions" described in this application.

In principle, most soluble cuprous salts and acids of "inert" anions are suitable, but cuprous sulphate in sulphuric acid solutions are strongly preferred for disproportionation, especially for the electrochemical processes. The concentration of acid should not be so high as to cause uneconomic losses of nitrile by hydrolysis, but high enough to control impurities.

Suitable inert anode for the electrochemical disporportionations

The voltate at which these processes operate depends on the nature of the anode and particularly on the efficiency of circulation of electrolyte about the anode. Dense graphite and carbon felt or cloth were suitable materials in well stirred solutions, with the first preferred, but in still solutions there is a substantial overvoltage at carbon anodes. Bright platinum or platinum-plated anodes allow the cell to operate at the lowest voltage of any anode studied by us with moderate stirring and at much the same voltage, whether the electrolyte is well stirred or not. They are preferred above all others for small scale operations, but where economic considerations demand other materials, carbon anodes, with good circulation about the anode, are preferred. Gold, or gold-plated anodes operate at slightly higher voltages than do bright platinum anodes, but are satisfactory, although also expensive. Stainless steel anodes show a high overvoltage even when the anolyte is well circulated. The cupric salts tend to slowly remove nickel from the steel in the presence of nitriles, so steel anodes must be replaced at intervals. Lead anodes coated with $PbO_2$ are not suitable, we think, because the $Pbo_2$ oxidises cuprous ion to cupric ion. There is also a high overvoltage at lead.

The ideal requirement for a preferred anode is that it be inert, i.e., effectively unchanged by the electrolyte under the conditions of electrolysis, and that it allows electrochemical disproportionation of cuprous salts at an economic voltage. Thus the choice of anode in an industrial process depends on a balance between the cost of power, the cost of materials (e.g. expensive films of platinum or gold) and the practicality of good anolyte circulation (necessary for carbon anodes but not so much for platinum coated anodes). For the purposes of this invention, a platinum anode is the best known to us, but for economic reasons, a dense graphite anode in a well stirred solution is recommended for large scale processes.

Suitable materials containing copper

Reaction 1, especially as part of copper powder refining and copper powder electrorefining in principle, can be applied to most finely divided materials containing copper metal. Indeed massive copper reacts slowly by reaction 1. A limited amount of cuprous oxide with the copper can be treated by reaction 10 in conjunction with reaction 1, in the powder refining, provided that the acid and copper balance in maintained. Due regard should be paid to the chemistry of the impurities associated with the copper and in some cases these should be removed before reaction 1. Thus copper powder electrorefining could only be applied with difficulty to a material containing a high percentage of calcium carbonate because of reaction with the acid. Pretreatment e.g. with acid, would be necessary. Examples of materials we have found suitable for copper powder refining and reaction 1 follow. All were used as at least minus 16 mesh materials. Cupreous powder or cement copper (cf. Butts); atomised "blister" copper, scrap copper, and anode copper (each divided for example by atomising the molten material with steam, cf. Butts); tinned copper nuggets, copper alloys containing more than 65% copper (e.g. most brasses) as shavings; copper metal in slag heaps; the concentrate from the TORCO process, copper-lead drosses from lead smelters, and materials containing copper, silver and gold, e.g. anode slimes. Copper precipitated by hydrogen reduction from solutions of copper salts is thought to be suitable but was not tested.

Copper powder electrorefining is best suited to materials of high copper content (more than 98% copper) but copper powder refining is in principle (with due regard to the chemistry of impurities, e.g. high proportions of iron) applicable to materials containing both large (e.g. blister copper) and moderate (e.g. TORCO concentrate) proportions of divided copper, because successive refining steps lead eventually to pure copper.

The rate of reaction 1 is very dependent on the particle size of the materials containing the copper. Reduction to a mesh size of 95% minus 16 plus 240 is preferred for all applications of reaction 1. If the particles are too fine, problems with filtration arise.

Reference to other materials like copper oxides and sulphides are intended to refer also to minerals, ores, mattes and so on, containing these materials. Their efficient leaching requires division preferably to smaller than 16 mesh. Such materials include cuprous sulphide, cupric sulphide, bornite, chalcocite, cuprous oxide, cupric oxide, chrysocolla, other copper sulphide ores, other oxidised copper ores, copper mattes, and anode slimes, provided that they are finely divided. The cupric sulphate from leaching of oxidised copper ores, copper ammonium salt solutions from ammoniacal leaching, the tankhouse electrolyte from cupric electrorefining, and oxidised copper rod for wire drawing are suitable materials for conversion to cuprous sulphate solutions by one or more of reactions 1–13 and subsequent reduction to copper powder or copper cathodes by disproportionation. As noted, chalcopyrite is not suitable unless pretreated to convert it to some other mineral.

Suitable and preferred compositions

Thermal and electrochemical disproportionations rely on a supply of homogenous solutions of suitable cuprous salts in acidified solutions of water containing an organic nitrile. A preferred general composition for disproportionation is cuprous sulphate assaying about 2–5% by weight $Cu^+$, in water containing sulphuric acid and about 15 to 20% by volume of volatile acetonitrile, or "non volatile" 2-hydroxycyanoethane, with additives and seeds in the case of thermal disproportionation. The specific compositions are limited by such factors as the solubility of cuprous and cupric salts at appropriate stages of the process. They are limited by the relation between the proportions of nitrile required for solvation of the cuprous ion (minimum of 2 to 3 moles per mole of $Cu^+$), by the concentration of cuprous ion needed to prevent polarization of the electrodes in the electrolytic methods, by the miscibility of the nitrile, by the suitability of the anion accompanying the cuprous cation, by the necessity to keep solutions at a suitable pH and by the desired purity and physical nature of the copper, which depends on the composition, especially in the electrochemical processes.

With these factors in mind, the following compositions are preferred for the processes noted. They may be made in part by one or more of the reactions 1–13.

Thermal disproportionation cuprous winning and copper powder refining

Prior to removal of the volatile nitrile, the solution preferably contains cuprous sulphate in any desired proportion consistent with its solubility and the availability of starting materials; water; sufficient sulphuric acid (preferably 1 to 2% by volume) to maintain acid conditions throughout the process, and between 2.5 to 10 moles (preferably 4 to 6 moles) of a suitable volatile organic nitrile per mole of cuprous ion present plus 10 to 10,000 ppm additives and copper seeds. For copper powder refining it may be more convenient to start with cupric sulphate in 1 to 4% by volume sulphuric acid, water, and between 7 to 20 moles of a volatile nitrile per mole of cupric ion, plus additives.

Preferred compositions for reactions 1 to 13

These are indicated in the discussion of these reactions or in the examples, and in the claims specifying methods based on these reactions. A summary of preferred compositions follows, based on nitriles of relatively low molecular weight (40–100) and density 0.8–1.1, and also on the use of sulphates in the normal way, remembering the relationship (about 2.5:1) between moles of nitrile and moles of cuprous ion and the need for homogenous compositions.

| Reaction | $CuSO_4$ %$Cu^{2+}$wt | $RCN^b$ %vol | $H_2O^a$ %vol | $H_2SO_4$ | Other$^c$ | Reactant$^d$ |
|---|---|---|---|---|---|---|
| 1 | 0.5–5 | 8–30 | | 0.5–4 | — | Cu |
| 2 | 0.1–2 | 8–30 | | 1–5 | oxygen | Cu |
| 3 | 2–5$^e$ | 30–60 | | 3–10 | — | $Cu_2S^g$ |
| 4 | 0.5–2$^e$ | 30–60 | | 4–10 | oxygen | $Cu_2S^g$ |
| 5 | 2–5$^e$ | 30–60 | | 3–10 | — | $CuS^g$ |
| 6 | 0.5–2$^e$ | 30–60 | | 4–10 | oxygen | $CuS^g$ |

| Reaction | CuSO$_4$ %Cu$^{2+}$wt | RCN[b] %vol | H$_2$O[a] %vol | H$_2$SO$_4$ | Other[c] | Reactant[d] |
|---|---|---|---|---|---|---|
| 7 | >0.1 | 8–30 | | <0.5 | SO$_2$/Base | — |
| 8 | 0.5–5[e] | 8–30 | | 0.5–4 | — | M |
| 9 | 0.5–4 | 35–60 | | 0.5–4 | — | Ag |
| 10 | — | 6–30 | | >2 | — | Cu$_2$O |
| 11 | — | 95–98 | —[f] | 2–5 | — | Cu$_2$S[g] |
| 12 | >0.05 | 6–25 | | — | SO$_2$ | CuO |
| 13 | — | 8–60 | | 0.5–2 | Ag$^+$ | Cu |

(a) The composition was completed with water. (b) RCN is a suitable nitrile and the percentage volumes should be adjusted for nitriles of much higher molecular weight and density than acetonitrile. (c) The reactions also require these substances, i.e., saturated oxygen or SO$_2$. (d) Sufficient of the composition required to treat the quantity of available reactant, according to the stoichiometry of the equations is used, the reactants are finely divided solids containing these materials. (e) Added in batches if liquids are not homogenous. (f) No water. (g) Includes minerals and non stoichiometric copper sulphides.

Preferred compositions for electrochemical disproportionation

The preferred compositions contain a solution of cuprous sulphate assaying between 2 to 5% cuprous ion on a weight basis, water, 5 to 10% by volume sulphuric acid, and 3 to 8 moles of a suitable organic nitrile, preferably 2-hydroxycyanoethane or acetonitrile, per mole of cuprous ion. 2-hydroxycyanoethane requires higher voltagge than acetonitrile. Additives (e.g. glue and thiourea and sodium alkylarylsulphonates) designed to improve cathode quality are desirable, in similar proportions to those used for cupric electrorefining.

Upper limits on the Cu$_2$SO$_4$ concentration are imposed by its solubility in the composition at the temperature of operation, lower limits by the need to have sufficient cuprous ion to prevent polarization of the electrodes at the current density and rate of stirring chosen. If these limits are exceeded, it is immediately obvious.

The concentration of sulphuric acid is determined at the lower limit by an acceptable low electrical resistance. The resistance increases with decreased concentration of acid. At the upper limit, the concentration of acid is determined by the efficiency of the process and the quality of the cathodes, both of which decrease as the concentration of acid rises above ca. 8% by volume.

The proportion of nitrile is determined by the need to stabilize the cuprous sulphate solution and to slow the oxidation (Table 2), so that at least 3 moles of nitrile per mole of cuprous ion, is preferred.

The following descriptions illustrate the preferred embodiments of the invention for processing copper via solutions of cuprous salts in acidified aqueous solutions of organic nitriles.

A. Methods of preparing solutions of cuprous salts

Reaction 1

The following general procedure was used to obtain the data in Table 1. Materials (10–100 gm) containing copper as shown in Table 1 weighing sufficient to satisfy the stoichiometry of reaction 1, and of size minus 30 to plus 60 mesh were leached in a reaction vessel by stirring or shaking under an atmosphere nitrogen at about 50°C, with 500–2000 ml solutions of AR grade cupric sulphate containing 30–40 gms/liter of cupric ions, 25–30% by volume acetonitrile, water, and between 1–2% by volume sulphuric acid. The reaction mixture usually contained about 3–4% by weight of solids, depending on the copper content of the materials. Leaching was continued until the copper values in the solution had reached a steady value. In nearly all cases this was less than forty minutes if the stirring was vigorous.

The process of the reaction 1 was also monitored by the decrease in blue colour of the cupric sulphate and of course by disappearance of solid copper.

The solution of cuprous sulphate from reaction 1 was filtered and centrifuged and stored under nitrogen in a sealed vessel. Analysis of these cuprous solutions, based on ppm of the copper content, are compared with the purity of the original materials containing copper in Table 1.

The table also includes some analysis of the copper powder and copper cathodes produced by thermal and electrochemical disproportionation respectively of these solutions. For electrochemical disproportionation, the acidity was increased to 5% by volume sulphuric acid.

Variation of conditions

The following variations of reaction 1, as specified, were performed using 2 gms. of Mt. Isa blister copper (cf. Table 1) as feed and 100 ml of the composition. Unless stated otherwise, the blister copper had dissolved in less than 30 minutes to give cuprous solutions with similar assays as for the reaction with blister copper shown in Table 1. Many of the findings are relevant to other reactions and processes.

a. Variation of cupric salt

The cupric sulphate and sulphuric acid of reaction 1, were replaced with cupric nitrate and 0.1 molar nitric acid respectively, dissolution of copper to a colourless solution was rapid, copper was recovered by thermal disproportionation. If 0.5 molar nitric acid was used, the copper dissolved, but the solution was blue and contained mostly cupric nitrate due to the oxidation of cuprous nitrate. Nitric acid was consumed and copper could not be recovered by thermal disproportionation.

b. Variation of nitrile

Reactions 1 proceeded to dissolve copper using (a) 30% by volume 2-hydroxycyanoethane, (b) 20% propionitrile plus 16% ethanol by volume, (c) 30% acrylonitrile plus 30% ethanol by volume (d) 20% acetonitrile plus 5% acrylonitrile by volume; in place of the 25% by volume of acetonitrile.

c. Variation of temperature

Acetonitrile was hydrolysed to acetic acid and ammonium acetate within 24 hours in 2 molar sulphuric acid in a sealed tube at 100°C. 2-hydroxycyanoethane is reported to hydrolyse at a comparable rate. Solutions of acetonitrile, water, cuprous sulphate and 1N sulphuric acid, within the compositions claimed, had not lost detectable amounts of acetonitrile, following heating in sealed tubes at 50°C after 2 months. The acetonitrile-water azeotrope boils between 70°–80°C the propionitrile-ethanol-water azeotrope at 79°C. These facts illustrate some possible upper limits to temperature, but within these limits a temperature which gives satisfactory solubility of $CuSO_4$ and fast enough dissolution of copper, i.e., 50°C, was preferred for reaction 1. The half life was very roughly halved for every 10°C rise in temperature for dissolution of a given material with a given composition.

TABLE 1

Purity of cuprous solutions, prepared by reaction 1 and of copper powder and of copper cathodes prepared by thermal and electrochemical disproportionation of the same solutions.

| Impurities | Feed ppm/$Cu^f$ | $Cu^+$ soln$^a$ ppm/Cu | Powder$^{b,j}$ ppm/Cu | Cathode$^{c,j}$ ppm/Cu |
|---|---|---|---|---|
| Blister$^j$ | | | | |
| Ni | 150 | 150 | 1.5$^e$ | <2.5 |
| Sb | 24 | — | 2.7$^e$ | — |
| As | 330 | — | 7.1$^e$ | — |
| Fe | 63 | 60 | <5 | <5 |
| Pb | 480 | 145 | 5.5$^e$ | 16 |
| Ag | 212 | 1.6 | <5 | <1 |
| Bi | 8 | — | 0.8$^e$ | — |
| Cement$^{d,j}$ | | | | |
| Fe | 27,000 | — | 240$^e$ | — |
| Sn | 6,000 | — | 75 | — |
| Cement$^{h,j}$ | | | | |
| Fe | 1,500 | 1,200 | <5 | <5 |
| Anodes$^j$ | | | | |
| Bi | 3 | — | N.D.$^e$ | — |
| Pb | 50 | — | 0.6$^e$ | — |
| Sb | 13 | — | 0.2$^e$ | — |
| Ag | 144 | — | 5$^e$ | — |
| Se | 10 | — | 0.7$^e$ | — |
| As | 152 | — | 0.6$^e$ | — |
| Ni | 234 | — | 0.1$^e$ | — |
| Fe | 14 | — | 5.5$^e$ | — |
| Co | 2 | — | N.D.$^e$ | — |
| Blister$^j$ | | | | |
| Bi | 3 | — | (<0.1)$^{e,i}$ | — |
| Pb | 920 | — | (2.1)$^{e,i}$ | — |
| Sb | 42 | — | (0.1)$^{e,i}$ | — |
| Sn | 7 | — | (N.D.)$^{e,i}$ | — |
| In | 5 | — | (N.D.)$^{e,i}$ | — |
| Ag | 172 | — | (17)$^{e,i}$ | — |
| Se | 319 | — | (0.5)$^{e,i}$ | — |
| As | 27 | — | (<0.2)$^{e,i}$ | — |
| Ni | 388 | — | (<0.1)$^{e,i}$ | — |
| Co | 9 | — | (N.D.)$^{e,i}$ | — |
| Fe | 9 | — | (2.9)$^{e,i}$ | — |
| Mn | 0.2 | — | (N.D.)$^{e,i}$ | — |
| Tinned$^j$ | | | | |
| Sn | 3% | — | 1000 (150)$^i$ | — |
| Brass$^j$ | | | | |
| Pb | 3.4% | 0.22% | 20 | 550 |
| Zn | 36.1% | 32.6% | 50 | 18 |
| Sn | 1,000 | — | <200 | <200 |
| Fe | 1,890 | 2,000 | 10 | <5 |
| Ag | 61 | 5 | <5 | <5 |
| Cd | 87 | 90 | <1 | <3 |
| Ni | 1,320 | 1,300 | <4 | <4 |
| Torco$^{d,j}$ | | | | |
| Sb | 3.8 | — | 0.16$^e$ | — |
| Pb | 28 | 12 | 0.34$^e$ | — |
| Ni | 105 | 180 | ND$^e$ | — |
| Zn | 40 | 40 | 6 | — |
| As | 4.3 | — | ND$^e$ | — |
| Ag | 22.5 | <1 | <1$^e$ | — |
| Se | 7.5 | — | ND$^e$ | — |
| Ca | 370 | 400 | <6 | — |
| Mg | 6,400 | 560 | 36 | — |
| Fe | 10,000 | 3,250 | 11.5$^e$ | — |
| Bi | 4.66 | — | 0.69$^e$ | — |
| Te | 1.04$^e$ | — | ND | — |
| Dross$^j$ | | | | |
| Pb | 61% | 5.5% | 16 | — |
| Zn | 18,000 | 2.7% | <4 | — |
| Fe | 1,020 | 1,250 | <2.5 | — |
| Ag | 456 | 3 | 15 | — |
| As | 4,600 | — | 920$^e$ | — |
| Ni | 490 | 680 | <2.5 | — |
| As Sludge$^j$ | | | | |
| As | 35% | 4% | 400 | <200 |
| Bi | 3,300 | 44 | <18 | <18 |
| Sb | 11,000 | 390 | 200 | 100 |

(a) Prepared by the method of reaction I using the general procedure specified. Impurities as parts per million of copper present. (b) By thermal disproportionation of solution (footnote (a)) using the general procedure specified. (c) By electrochemical disproportionation of solution of footnote (a), using the material containing copper to reduce the anolyte and the general procedure specified. (d) This sample was supplied by Copper Refineries Pty. Ltd. and was heavily oxidised, so that more sulphuric acid than specified in the general example was added to maintain an acidity of about 1 normal. (e) As measured by mass spectrometry, N.D. denotes not detectable. (f) Analysis by atomic absorption following dissolution in nitric acid. (g) 5% by volume $H_2SO_4$ was added, prior to thermal disproportionation. (h) From cementation of a commercial cupric sulphate with iron. (i) Value in parenthesis is that for two cycles of powder refining. (j) Feeds in order of presentation were, blister — molten blister copper assaying 95% copper was atomised with steam and supplies by Copper Refineries Pty. Ltd. of Townsville; cement — This was 85% copper from Mt. Canindah supplied by Copper Refineries Pty. Ltd; cement — reference h; Anodes — Molten copper, used to prepare anodes at Copper Refineries Pty. Ltd. was atomised with steam; Blister — Shavings from blister copper supplied by Mt. Morgan to the Geology Department of the ANU; Tinned — Copper was contaminated with 3% tin by weight; Brass — A commercial sample, 65% in copper was divided into shavings; Torco — This was powdered copper assaying 75% copper, from Nchanga Consolidated Copper Mines supplied by Copper Refineries Pty. Ltd; Dross — This was powdered dross of copper silver and lead, assaying 61% lead and derived from the Imperial Smelter. It was supplied by CRA Ltd; As Sludge — This was a copper-arsenic sludge assaying 35% copper and 35% arsenic from a copper refining process and supplied by Copper Refineries Pty. Ltd.

d. Variation of Acid Concentration and Proportions of cupric sulphate and copper The solubility and in part the chemistry of materials accompanying the copper (e.g. iron, antimony, tin, arsenic) as well as the solubility of cuprous and cupric sulphate in water-nitrile mixtures, were found to depend on the acidity. Thus $CuHSO_4$ and $Cu(HSO_4)_2$ are more soluble than the sulphates, so higher proportions of copper in solution are possible at higher acidity. Copper arsenates precipitate and ferric, antimony and bismuth salts tend to hydrolyse and precipitate from the cuprous solutions if the acidity decreases, as it does in the presence of air. Basic cuprous salts also precipitate at pH 6–7 but redissolve as acid is added. Sulphate ion is a relatively strong base in solutions containing high proportions of nitrile. Oxygen is converted to base as it oxidises cuprous ion and thus decreases the acidity. Some details of oxidation are given in Table 2. The oxidising power of >0.2N nitric acid towards copper has already been noted. Heavily oxidised copper (e.g. cement copper) consumed a considerable amount of acid, so that about 5% by volume was preferred with adjustments as reaction proceeded.

TABLE 2

Oxidation of Stirred Cuprous Sulphate Solutions in Acidified Acetonitrile-water mixtures at 25° C under an oxygen atmosphere at a pressure of 1 atm. Effect of Nitrile and Acid Concentration.

| $[Cu^+]$ % wt | $[CH_3CN]$ % vol | $[H_2SO_4]$ % vol | Time (min) for 30% of Theoretical $O_2$ uptake |
|---|---|---|---|
| 1.5 | 10 | 5 | 95 |
| 1.5 | 30 | 5 | 300 |
| 1.5 | 50 | 5 | 340 |
| 1.5 | 30 | 10 | 375 |
| 1.5 | 30 | 2.5 | 330 |

$^a$Based on the expected reaction $4Cu^+ + O_2 + 4H^+ \rightarrow 4Cu^{2+} + 2H_2O$.

The control of acidity depends on the impurities and the presence of oxygen, but for relatively pure (>99%) copper about 1—2 normal sulphuric acid was preferred for reaction 1, with control of this acidity to within 10% of these values during the life of the solution. The behaviour of most salts in solutions of various acidities containing organic nitriles and more than 50% water, can be more or less predicted from their behaviour in aqueous solution, except that most salts, except those of $CU^+$, $AG^+$ and $Au^+$, are less soluble than in water containing no organic nitrile. Some solubilities are in Table 3

TABLE 3

Solubilities of salts in acidified [2% v/v $H_2SO_4$] acetonitrile-water mixtures at 25°C.

| Hydrated Salt ($MX.nH_2O$) | % $CH_3CN$ v/v | Solubility (MX) (g/l) |
|---|---|---|
| $NiSO_4.7H_2O$ | 16.6 | 231 |
| $CoSO_4.7H_2O$ | 16.8 | 149 |
| $FeSO_4.7H_2O$ | 25 | 89.5 |
| $Fe_2(SO_4)_3.9H_2O$ | 10.8 | 325 |
| $CdSO_4.8H_2O$ | 15 | 492 |
| $Ni(NO_3)_2.6H_2O$ | 25 | 713 |
| $Cu(NO_3)_2.3H_2O$ | 25 | 360 |
| $CuSO_4.5H_2O$ | 25 | 38 |
| $Cu_2SO_4$ | 25 | $90^a$ |
| $Ag_2SO_4$ | 25 | 60 |

$^a Cu_2SO_4$ disproportionates if more than this is present in 25% acetonitrile.

The solubility of cupric sulphate ranges between about 10% to 0.3% $Cu^{2+}$ by weight for aqueous solutions containing 0.2–10% sulphuric acid by volume and 0–50% acetonitrile by volume at 50°C. The solubility at 25°C was about half that at 50°C. The amount of cuprous sulphate which can exist in aqueous solutions containing sulphuric acid and acetonitrile varies with the proportion of acetonitrile in solution, at least 2.5 moles of acetonitrile per mole of cuprous ion is needed. Slightly less cuprous solution can exist without disproportionation at lower acid strengths, e.g. 0.2% by volume.

Concentrations of up to 17% $Cu^+$ by weight as $CuHSO_4$ were produced in acidified water containing 50–60% acetonitrile by volume at 50°C. The quantity of cupric sulphate required to produce this concentration via reaction (1) is greater than the solubility of $CuSO_4$ in these compositions, but suspensions of $CuSO_4.5H_2O$ were sometimes used for reaction 1. As noted, sulphate ion in such compositions is a fairly strong base, and so reduces the acid strength effectively. If the subsequent application was thermal disproportionation, the cupric sulphate often precipitated at undesirable stages of the process. Thus lower amounts of $CuSO_4$ and $CuHSO_4$ were preferred in such cases. The greater solubility of cupric nitrate was an advantage when solubility problems arose.

e. Variation of Nitrile Proportion

The following results provide useful information. Significant proportions of cuprous sulphate were produced in acidified aqueous solutions containing as low as 3% acetonitrile by volume. Solutions of $CuHSO_4$ containing up to 17% cuprous ion by weight were produced in acidified water containing 60% acetonitrile by volume at 50°C. Acetonitrile was not miscible in all proportions with water containing a high concentration of electrolytes, particularly ferrous, nickel, cupric and cobalt sulphates. If two layers formed, more water was added or less salt was used. The rate of oxidation of cuprous solutions depended to some extent on the proportion of nitrile (cf. Table 2). Thus oxidation was slower in 30% acetonitrile by volume than in 10% acetonitrile-water, for a solution 1.5% by weight in $Cu^+$. However if the subsequent use of the solution is thermal disproportionation, unnecessary energy was consumed in distilling excess nitrile, and if electrochemical disproportionation, voltages were higher with increasing nitrile. Also losses of expensive nitrile are increased if this solution contains high proportions of nitrile, so a balance had to be achieved and 15–30% by volume organic nitrile was commonly used.

f. Behaviour of impurities

Representative examples of most materials which are only slightly soluble in water acidified with sulphuric acid, have been found to be also only slightly soluble in acidified water-organic nitrile mixtures containing cupric salts. Thus gold, antimony, mercury, lead, carbonaceous material (e.g. wood and coal), sand, bauxite, sulphur, lead sulphate, silver chloride, metastannic acid and paraffin were found not to dissolve significantly in the compositions specified for reaction 1. Thus copper can be leached from such materials by reaction 1 as confirmed in part by the results in Table 1. The other materials were left as residues.

Representatives of many water soluble salts, oxidisable metals and many basic species were found to dissolve in the compositions. Thus iron, tin, nickel, cadmium and zinc, sodium chloride and limestone or oxides of copper, nickel and iron dissolved to some extent in the acidic compositions. In most cases such dissolved species remained in solution during subsequent disproportionation, of the cuprous solution to recover copper, provided that the pH was held more or less constant. Control of pH to relatively low values (<2) was especially important when arsenic, iron, bismuth or antimony salts were present. Some problems which arose are indicated.

Soluble salts whose anions form insoluble cuprous salts, such as sodium halides and cyanide, were leached from the copper, preferaby with hot water, before reaction 1, for optimum recovery of copper.

Silver was found to dissolve in compositions of high nitrile content in the presence of excess cupric salt and precipitate as the nitrile content was lowered, e.g. by thermal disproportionation, so silver was cemented from solutions containing silver and cuprous sulphate with copper, prior to disproportionation. Silver contamination was greater in solutions of higher acidity.

Solutions of relatively high acidity were used to leach copper from materials containing large proportions of iron, oxygen, carbonate, bismuth, arsenic, or antimony and the acidity was kept high throughout processing, if large amounts of iron, arsenic or antimony were present.

If large quantities of foreign salts were present, (e.g. $CoSO_4$, $NiSO_4$, $FeSO_4$) the nitrile-water mixtures sometimes separated into two layers. In such cases the materials were pretreated with acidified water to remove such salts, or a greater volume of a composition containing more water was used.

Tin dissolved according to reaction 8, when tin was present in the material containing copper. The resulting stannous sulphate solution presumably was oxidised to stannic salts, during thermal disproportionation of the cuprous salt, and insoluble tin salts, presumably metastannic acid, contaminated the copper produced by thermal disproportionation.

This problem was partly solved by performing reaction 1 a second time, when the copper was leached from a white solid, presumably the now insoluble tin salts, to give purer cuprous sulphate solutions. Boiling with excess cupric sulphate converted soluble stannous to insoluble stannic salts which precipitated before disproportionation and were filtered off.

g. Effect of particle size and solid-liquid density

Reaction 1 was >90% completed in less than 20 minutes at 50°C when materials, containing high proportions of copper, of minus 60 mesh, and present at about 4% by weight of the reaction mixture, were well agitated with the compositions specified for reaction 1.

The rate of dissolution slowed markedly as the particle size increased and particles +16 mesh usually took more than 1 hour to dissolve. Extremely fine material, (e.g. −250 mesh), was difficult to handle and filter and also was heavily oxidised, so that material −30 to +100 mesh was preferred for reaction 1.

EXAMPLE 20 gm of copper concentrate (analysing 75% copper) prepared by the TORCO process from Nchanga Consolidated Copper Mines and supplied by Copper Refineries Pty. Ltd., was −60 mesh and was stirred with 60 gm of $CuSO_4.5H_2O$ in 100 ml of acetonitrile, 250 ml of water and 10 of sulphuric acid at 50°C for 1 hour under nitrogen. The solution was filtered and distilled slowly under nitrogen to give 11.4 gms of copper. The residue was 5.6 gms containing 0.39 gms of copper. Thus the extraction was 97.4% of the available copper. A partial analysis of the original TORCO copper, the extracted solution and the copper powder produced by thermal disproportionation is in Table 1. The increased residue may be due to sulphates formed during the leach.

Reaction 2

Reaction 1 was repeated with 5 gm of −30 + 100 mesh copper powder using 100 ml of solution containing 1 gm per liter of cupric ion (i.e., less than stoichiometric) at 25°C with good stirring under a slight positive pressure of oxygen, with 5% sulphuric acid by volume but otherwise as described for general reaction 1. 2 gm of copper dissolved in 100 ml of solution over a period of ninety minutes to give a very pale blue solution of cuprous sulphate. The rate of reaction of oxygen with cuprous ion was slow (cf. Table 2) so that it was possible to maintain a very pale blue reaction mixture.

Reaction 3

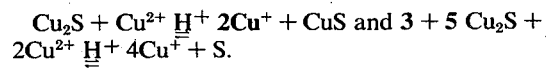

$Cu_2S + Cu^{2+} \underline{H}^+ 2Cu^+ + CuS$ and $3 + 5$ $Cu_2S + 2Cu^{2+} \underline{H}^+ 4Cu^+ + S$.

Examples (a) Leaching of Cuprous Sulphide 1 gram of finely divided (−100 mesh) cuprous sulphide and materials containing cuprous and sulphide ions were stirred for about 8 hours by gentle reflux at about 70°–75°C under nitrogen with more than a twofold excess of cupric sulphate, (i.e., 3% $Cu^{2+}$ by weight) in 50 ml of 50% by volume acetonitrile, 5% sulphuric acid by volume and 45% water. The solution was separated from solids including some sulphur, and was stored in a sealed vessel. The reaction proceeded readily with all materials tested, other than chalcopyrite, as shown in Table 4. Complete separation of fine sulphur was difficult to achieve and traces reacted with copper in subsequent disproportionations. The conditions specified are too vigorous for reaction 3 alone as seen in Table 4, reaction 5 also took place, so that the reaction can be regarded as $Cu_2S + 2Cu^{2+} \rightleftharpoons 4Cu^+ + S$.

TABLE 4

Leaching of cuprous ions from cuprous and sulphide ions.

Reaction 3 and 5, over 8 hours at 70°–75°C.

| Material[a] | % Cu[b] | % Cu extracted[c,d] Reaction 3 | % Cu extracted Reaction 4[c,d] |
|---|---|---|---|
| 1 $Cu_2S$ | 80 | 120–160 | 190 |
| 2 Bornite | 30 | 140–150 | — |
| 3 Cu Matte | 38 | 130–160 | 190 |
| 4 Digenite | 60 | 100–140 | — |
| 5 Djurleite | 80 | 120–140 | 190 |
| 6 Chalcopyrite | 30 | 30–45 | 74 |

(a) Samples were minus 100 mesh provided by the Geology Department, Australian National University. (b) Analysed by leaching with aqua regia, % Cu in material. (c) Percentage of copper extracted, based on percentage available from reaction (3) or (4) i.e. 50% of total copper. (d) Percentages are higher than 100% in cases where reaction 5 follows reaction 3 (vide infra) and figures represent equilibrium values. Reaction 3 was complete in less than 8 hours with most materials (vide infra) and was fast with pure cuprous sulphide (see Table 5). Range of values represents results from three experiments with different stirring. These results were obtained before we realised that reaction 3 plus 5 was an equilibrium, less vigorous conditions are satisfactory.

b. Leaching of copper matte

A sample of 2 gm of copper matte, supplied by the Mt. Lyell Company, assaying 38% copper was ground to −100 mesh and was refluxed for 1 hour with 4.0 gm of $CuSO_4.5H_2O$, 5 ml of sulphuric acid, 50 ml of acetonitrile and 50 ml of water under nitrogen. The copper content of the solution had increased by 0.44 grams. Thermal disproportionation gave 0.22 grams of copper powder, which is slightly more than 100% recovery based on reaction 3, i.e., reaction 5 is also operative.

50 gm of copper matte supplied by Mt. Isa Mines Pty. Ltd., containing 24 gm of copper values was ground to minus 100 mesh and vigorously stirred for 1 hour at 50°C under a nitrogen atmosphere in a sealed reaction vessel with a composition of 160 gm of $CuSO_4.5H_2O$, 1 liter of acetonitrile, 800 ml of water and 200 ml of sulphuric acid.

34 gm of a black solid containing 10.6 gm of copper and 2.1 gm of elemental sulphur remained. The liquor was filtered off and thermally disproportionated to give 5.2 gms of copper powder, contaminated with a little cuprous sulphide. Thus 13.4 gms of copper was reached, corresponding to a little more than a quantitative reaction 3. The residue was leached a second time with a fresh cupric sulphate solution to leach a further 12% of the available copper.

c. Effect of Variables

Reaction 3 was performed over one hour with 1 gm sample of −60 mesh cuprous sulphide under an inert atmosphere.

The proportions of acid, cupric sulphate and acetonitrile were varied, as was the temperature. Higher yields of copper were extracted than is expected from reaction 3 because of reaction 5. Results are in Table 5. The equilibrium constant for both reactions increased as the nitrile proportion increased.

Reaction 3
$$Cu^{2+} + Cu_2S \underset{}{\overset{H^+}{\rightleftharpoons}} 2Cu^+ + CuS$$
plus
Reaction 5
$$CuS + Cu^{2+} \underset{}{\overset{H^+}{\rightleftharpoons}} 2Cu^+ + S \text{ i.e., } Cu_2S + 2Cu^{2+} \rightleftharpoons 4Cu^+ + S$$
Reaction 4
$$2Cu_2S + 2H^+ + \tfrac{1}{2}O_2 \rightleftharpoons Cu^{2+} + 2Cu^+ + H_2O + 2CuS$$

This reaction was performed exactly as described for reaction 3, example (a), except that cupric sulphate assaying 1% $Cu^{2+}$ by weight was used and reaction proceeded with stirring under a positive pressure of oxygen. The acid concentration dropped and the solutions were a pale blue. Results are shown in Tables 4 and 5. The reaction provided a more efficient leach than reaction 3, we think because cuprous ions are removed by oxidation to cupric ions, allowing equilibrium to proceed further to the right.

Example (Reaction 4 and 6)

25 gms of minus 60 mesh cuprous sulphide was stirred with 19.6 gms of $CuSO_4.5H_2O$ in 600 ml of acetonitrile, 120 of sulphuric acid, and 480 mls of water under oxygen at 1 atmosphere and 50°C. The experiment was repeated with 20.0 gms of copper matte containing 11.9 gms of copper of minus 60 mesh. The solutions were sampled at different times with the results in Table 5.

TABLE 5

Reaction 4 and 6 off cupric sulphate with cuprous sulphide and copper matte under oxygen at 1 atmosphere at 50°C.

| time mins | % Cu extracted from $Cu_2S$ Reaction 4[a] | % Cu extracted from matte Reaction 4[a,b] |
|---|---|---|
| zero | 84% | 77% |
| 25 | 116 | 86 |
| 60 | 148 | 94 |
| 180 | 174 | 106 |
| 300 | 178[c] | 110 |

(a) A value of 100% corresponds to quantitative reaction 4, a value of 200% corresponds to quantitative reaction 4 plus 6, i.e., complete leaching of all the available copper. (b) For the purpose of the calculation it is assumed that the copper in the copper matte is all present as cuprous sulphide, but this was not established. (c) The residue contained 3.4 gms of sulphur and 0.8 gm of sulphur were in solution, i.e., 84% of the available sulphur. (d) Matte supplied by Mt. Isa Mines Pty. Ltd.

In summary: (i) Reaction 3 proceeded readily to its equilibrium value at 25°C provided sufficient acid was present. A temperature of 50° was preferred because usually the slower reaction 5 was also desired. (ii) Both acid and cupric sulphate were necessary for optimum reaction and about 5% by weight of cupric sulphate, plus about 5% by volume sulphuric acid was preferred. (iii) The extraction was more efficient (i.e., equilibrium was further to the right) in a given time, the greater the proportion of acetonitrile and about 40% by volume was preferred. (iv) A solid-liquid ratio of 2% solids was quite satisfactory.

Reaction 5.

$$CuS + Cu^{2+} \underset{}{\overset{H^+}{\rightleftharpoons}} 2Cu^+ + S$$

This reaction was slower than the reaction (3) of cupric sulphate with cuprous sulphide and equilibrium does not lie completely to the right in most compositions. Sulphur was shown to react with cuprous ion in certain compositions to precipitate black (CuS?) and give a blue solution.

Some hydrolysis and polymerisation of the acetonitrile occur at high acidities and temperatures, as shown by the odour of acetic acid, so that this was balanced against the kinetics of the leaching process. There was a detectable reaction at 25°C, but most reactions were performed at 60°–70°C. In some cases, with high proportions of cupric sulphate the nitrile and water separated into two layers. More water was added, or less cupric sulphate was used, with subsequent addition as reaction proceeded. The effect of some variables, temperature, acidity, nitrile proportion, and concentration of cupric sulphate is shown in Table 7 and have also been indicated by data in Tables 4 and 6. In the experiment, 1.0 gms of −100 mesh cupric sulphide was refluxed at 70°–78°C, with the compositions shown, in a leaching vessel under a nitrogen atmosphere for 1 hours, unless stated otherwise. The solution was filtered, then thermally disproportionated to give the yields of copper shown. It was desirable to have an excess of sulphuric acid over cupric sulphate because of the basicity o sulphate ion in the high nitrile compositions.

TABLE 6

Leaching of copper from cuprous sulphide by reaction 3 and 5[a].

| [CuSO$_4$.5H$_2$O] gm | [MeCN] ml | [H$_2$O] ml | [H$_2$SO$_4$] ml | % Cu extracted[c] |
|---|---|---|---|---|
| 5.00 | 25 | 25 | 0.05 | 55 |
| 5.00 | 25 | 25 | 1.0 | 95 |
| 5.00 | 25 | 25 | 2.5 | 125 |
| 5.00 | 25 | 25 | 5.0 | 145 |
| 5.00[b] | 30 | 20 | 2.5 | 110[b] |
| 5.00 | 30 | 20 | 2.5 | 160 |
| 5.00 | 20 | 30 | 2.5 | 95 |
| 5.00 | 10 | 40 | 2.5 | 45 |
| 1.00 | 10 | 40 | 0.25 | 25 |
| — | 25 | 25 | 5.0 | 70 |
| — | 25 | 25 | 2.5 | 65 |
| 1.00 | — | 50 | 0.25 | 9 |
| — | — | 50 | 0.25 | 15 | a. Reactions are under reflux at 70°–75°C. unless stated otherwise, for 1 hour and thus virtually oxygen free.
b. Reaction preformed for 1 hour at 25°C under nitrogen.
c. Based on that expected from reaction 3, values greater than 100% are due to reaction 5.

It was important to remove sulphur from the cuprous solution prepared by reaction 5 before thermal disproportionation, because sulphur reacted with copper powder to give a black solid under the conditions of disproportionation.

TABLE 7

Leaching of Copper Values from 1.0 gm Cupric Sulphide[d,k].

| (CH$_3$CN) ml | (H$_2$O) ml | (H$_2$SO$_4$) ml | (CuSO$_4$.5H$_2$O) gm | % Cu leached[c] | % Cu precipitated[e] |
|---|---|---|---|---|---|
| Under nitrogen at 1 atmosphere. | | | | | |
| 20[f] | 75 | 5 | 5.0 | 40[f] | — |
| 30 | 65 | 5 | 3.3 | 53[j] | 10 |
| 40[f] | 55 | 5 | 5.0 | 89[f] | — |
| 50 | 45 | 5 | 3.3 | 67 | 40 |
| 50[f] | 45 | 5 | 5.0 | 95[f] | — |
| 70 | 25 | 5 | 3.3 | 77[j] | 60 |
| 70 | 25 | 5 | 5.0 | 70[j] | — |
| 70 | 25 | 5 | 5.0 | 85[j] | — |
| 70[a] | 25 | 5 | 3.3 | 37[a] | 40[a] |
| 70 | 25 | — | 3.3 | 43 | 10 |
| 70 | 25 | 1 | 3.3 | 90 | 50 |
| 70 | 25 | 3 | 3.3 | — | 60 |
| 70 | 25 | 5 | 5.0 | 85 | — |
| 70 | 25 | 5 | — | — | 10 |
| 50 | 45 | 5 | 5.0 | 63 | — |
| 50 | 45 | 5 | 3.3 | 67 | — |
| 50[b] | 45 | 5 | 3.3 | 95 | — |
| 50[b] | 45 | 5 | 5.0 | 82 | — |
| 50[b] | 45 | 5 | 1.0 | 51 | — |
| 50[a,i] | 45 | 5 | 5.0 | 71[a,i] | — |
| Oxygen under pressure[f]. | | | | | |
| 50 | 45 | 5 | 5.0 | 92 | —[h] |
| 25 | 70 | 5 | 5.0 | 45 | —[h] |
| 0 | 95 | 5 | 5.0 | 31 | —[h] |

(a) At 25°C. (b) At 50°C. (c) Increased copper (as $Cu^{2+}$ or $Cu^+$) following the leach, as measured by atomic absorption expressed as a percentage of the 0.63 gms expected for complete leach of 95% pure CuS. (d) Samples were minus 100 mesh and were stirred under reflux (about 70°C) for one hour unless stated otherwise. (e) Percentage of copper recovered from the leach solution after filtering and evaporating off the acetonitrile (thermal disproportionation), based on 0.63 gms of copper being available from $Cu^{2+}$+CuS → $2Cu^+$ + S → Cu + $Cu^{2+}$ + S. If values are not shown, disproportionation was not attempted. (f) Samples stirred in a bomb under an oxygen pressure of 100 p.s.i. at 70°C.. (g) Substantial quantities of sulphur were formed in these reactions. (h) Oxygen converts cuprous to cupric ions, (i) Sample as 0.5 gm of freshly precipitated CuS, refluxed for 30 minutes with the composition shown. (j) Under slight positive pressure of oxygen. (k) Note that these results were obtained before it was appreciated that reaction 5 was an equilibrium, so that extraction has not been optimized, nor was cuprous sulphate removed and replaced by cupric sulphate.

In summary: (i) Reaction 5 proceeded readily at 50°C, until the cuprous concentration was about 3% by weight, in about 50% acetonitrile-water, containing excess cupric sulphate and more moles of sulphuric acid than cupric sulphate (ii) Both acid and cupric sulphate are necessary for efficient reaction. (iii) The efficiency of extraction increased (i.e., the equilibrium lay further to the right) with an increased proportion of acetonitrile. (iv) Care had to be taken to ensure homogenous solutions in compositions high in acetonitrile and cupric sulphate. (v) The reverse reaction 5 prevented a quantitative leach in reactions producing high proportions of cuprous ion and sulphur.

EXAMPLE (Reaction 5)

25 gm of minus 60 mesh freshly prepared cupric sulphide was stirred in a reaction vessel under reflux for 1 hour with a composition of 110 gm of CuSO$_4$.5H$_2$O, 1100 ml of acetonitrile, 1000 ml of water, and 110 ml of sulphuric acid. The blue colour rapidly decreased in intensity and coagulated sulphur was observed.

The solution was filtered to leave 5 gm of a grey material, containing 0.15 gm of copper, soluble in carbon disulphide and which gave yellow sulphur on evaporation of the carbon disulphide. The filtrate contained 44 gms of copper, corresponding to a quantitative reaction 5.

It was thermally disproportioned to give 9 gms of copper power, contaminated with a little curpous sulphide.

Reaction 6

Reaction 5 was repeated using the conditions for Table 7 but under an atmosphere of oxygen. This had the effect of oxidising the cuprous to cupric ions and consuming some acid (cf. Table 2). It prevented the back reaction 5. Sulphur was produced by this procedure. Some results are included in Table 7 under footnote (j).

The reaction 6 was also carried out in a bomb with a pressure of 100 p.s.i.g. oxygen. Deep blue solutions of cupric sulphate rather than colourless cuprous sulphate were produced, due to oxidation of the cuprous ion produced by reaction 6. Results are also in Table 7. Some reactions 6, following reaction 4, are illustrated in Table 5.

Reaction of sulphur with cuprous ion and demonstration that 5 is an equilibrium.

a. A solution of cuprous sulphate, assaying 40 gms/liter cuprous ion in 45 ml of water, 50 ml of acetonitrile and 5 ml of sulphuric acid was refluxed with 1 gm of sulphur. A black precipitate and a deep blue solution was formed within 5 minutes, presumably because of the reactions:

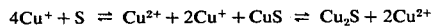

$$4Cu^+ + S \rightleftharpoons Cu^{2+} + 2Cu^+ + CuS \rightleftharpoons Cu_2S + 2Cu^{2+}$$

b. The above solution of cuprous sulphate, assaying 40 gms/liter cuprous ion, was refluxed for 1 hour with 1.7 gm of minus 100 mesh cupric sulphide, 5 gms of $CuSO_4.5H_2O$ and 3 ml of sulphuric acid. Only 0.5 gms of copper were extracted. An identical experiment, without cuprous sulphate, but the same proportions of water, acetonitrile, sulphuric but the same proportions of water, acetonitrile, sulphuric acid, and cupric sulphate, leached all the copper from 1.7 gms of cupric sulphide.

c. Sulphur dissolved in refluxing 50% acetonitrile, 45% water 5% sulphuric acid to the extent of about 0.05 gms./100 ml.

Method of Leaching chalcopyrite concentrates 50 gm of a chalcopyrite concentrate containing 26% copper by weight and supplied by Mt. Isa Mines Pty. Ltd. of Queensland was heated in a sealed vessel with 6 gms of powdered sulphur at 480°C for 5 hours. The product was ground to minus 60 mesh and analysed for iron and copper. 0.5 gm of this material was refluxed with 50 ml of a solution containing 2.5 gm of cupric sulphate, 5% sulphuric acid by volume, 50% acetonitrile by volume and 45% water by volume, for 2 hours. Analysis of the residue showed that 90% of the copper content and less than 10% of the iron had been extracted.

As shown already, (Table 4) chalcopyrite was not significantly leached of its copper under these conditions and it is thought that heating with sulphur converts the chalcopyrite to cupric sulphide and pyrite, to give a mixture more readily leached of its copper by reaction 5.

Reaction 7

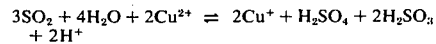

$$3SO_2 + 4H_2O + 2Cu^{2+} \rightleftharpoons 2Cu^+ + H_2SO_4 + 2H_2SO_3 + 2H^+$$

This reaction did not proceed satisfactorily in acidic solutions containing acetonitrile and water saturated with sulphur dioxide at normal temperature and pressure. The reaction gave higher yields of cuprous ion in acidified solutions (about 1N $H_2SO_4$) under pressure of 4–8 atmospheres at 50°–100°C, but even then did not proceed to completion. A complication is that cuprous sulphite was only slightly soluble in the solutions, whereas the bisulphite, $CuHSO_3$, was much more soluble. Thus it was important to control the pH during reduction and this was done very effectively by adding a salt of a weak acid, e.g. ammonium acetate or calcium carbonate. We used some salts, which play a dual role as a source of reducing agent and buffer, e.g. sodium bisulphite, or sodium metabisulphite, or acidified sodium sulphite and obtained quantitative reductions of cupric salt to cuprous bisulphite in water-organic nitrile mixtures. Salts of the curpric ammonium ion were reduced to solutions of cuprous bisulphite with excess $SO_2$ in the presence of at least 2.5 moles of nitrile per mole of potentially reducible cupric ion.

The following examples illustrate the reactions. Examples of thermal disproportionation of the resulting cuprous solutions are included.

Examples (a) – (c) and (h) illustrate preferred methods.

a. 10 g. of $CuSO_4.5H_2O$ was stirred for 20 minutes with 30 ml of acetonitrile, and 70 ml of water saturated with $SO_2$ containing 5 g. of ammonium acetate in a sealed reaction vessel. A pale green solution was formed. This was filtered to give a green cuprous salt solution which was analysed by thermally disproportionating it to give a copper precipitate, containing some $Cu_2SO_3$. This was filtered off and the solid was washed with 10 ml of 1N sulphuric acid. A blue solution was formed and 1.20 gm of copper was deposited, i.e., a quantitative yield, based on cuprous disproportionation.

b. The reaction was repeated, but adding 5 gm of calcium carbonate in place of the ammonium acetate in an open vessel. Carbon dioxide was evolved and a precipitate, through to be $CaSO_4$, was formed. The solution of cuprous salts was filtered off and the precipitate was washed with 30% acetonitrile-water, the two solutions were combined and thermally disproportionated to give 1 gm of copper, after washing the precipitated copper with 1n sulphuric acid.

c. 5 gm of $CuSo_4.5H_2O$ was reduced by stirring it for 20 minutes in 15 ml of acetonitrile, plus 35 ml of water, saturated with sodium metabisulphite in a sealed vessel. A pale green solution of cuprous salts was formed. This was acidified with 2 ml of sulphuric acid and thermally disproportionated. The residue was washed with 1n sulphuric acid to give 0.5 gm of metallic copper (80% yield).

d. 10 gm of $CuSO_4.5H_2O$ was reduced by shaking it for two hours with 15 ml of acetonitrile and 50 ml of water saturated with $SO_2$ at a atmospheric pressure. As the $CuSO_4$ reacted and dissolved, more $SO_2$ was bubbled into the solution. The solution was thermally disproportionated and the solid washed with sulphuric acid to give 0.55 gms of copper (<40% yield).

e. Experiment (d) was repeated in the presence of 10% v/v $H_2SO_4$. The yield dropped to 0.05–0.1 gms. (4–8%).

f. Experiment (d) was repeated with SO$_2$ saturated at 6 atmospheres and at 100°C (by saturating the solution at room temperature, sealing and heating at 100°C). The yield of copper had increased to 1.0 gms. (80%).

g. Experiment (f) was repeated in the presence of 10% v/v H$_2$SO$_4$. The yield of copper decreased to 20%.

h. A solution of cupric sulphate in 100 ml of water was treated with ammonia to give a deep blue solution. 50 ml of acetonitrile was added and the solution was saturated with SO$_2$. As more SO$_2$ was added the solution changed from blud to green to yellow and the pH decreased. The yellow solution was thermally disproportionated to give some copper powder.

Reaction 8

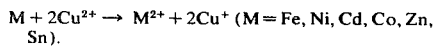

M + 2Cu$^{2+}$ → M$^{2+}$ + 2Cu$^+$ (M = Fe, Ni, Cd, Co, Zn, Sn).

Examples of reaction 8 and thermal disproportionation of resulting solutions.

a. A solution of cupric sulphate, assaying 5% by weight Cu$^{2+}$, in 25 ml of acetonitrile, 2 ml of sulphuric and 73 ml of water at 50°C in a sealed reaction vessel under nitrogen was shaken with 0.5 gm of the powdered metals (about −60 mesh) until the metals dissolved to give a clear solution. The results are shown in Table 8.

TABLE 8

Reduction of Cupric sulphate to cuprous sulphate and complete dissolution of metals by reaction 8.

| Metal | Time mins$^b$ | [Cu$^+$]$^c$ % |
|---|---|---|
| Fe$^a$ | 80 | 89% |
| Ni | 60 | 100% |
| Cd | 60 | 60% |
| Zn$^a$ | 40 | 66% |

(a) Hydrogen was also evolved. (b) This is the time for complete dissolution. (c) Cu$^+$ found, following complete dissolution of the metal, expressed as a percentage of Cu$^+$ expected for a quantitative reaction 8.

b. An iron nail weighing 0.92 gms was shaken with a solution of cupric sulphate assaying 2% by weight Cu$^{2+}$ in 30 ml of acetonitrile, 5 ml of sulphuric acid and 70 ml of water in a sealed vessel at room temperature. The nail dissolved completely within 24 hours. The solution was colourless and no copper powder could be detected in the reaction vessel. The solution was filtered and was thermally disproportionated to give 0.92 gms of copper containing 0.005% iron.

A duplicate experiment, with 30 ml of water replacing all the acetonitrile and only 1% by weight Cu$^{2+}$, gave a copper coated nail in a still blue solution containing 0.5% by weight Cu$^{2+}$. The copper coated nail still contained significant amounts of iron at its centre, and the solution was still blue after 5 days. Thus aqueous cementation was much less effective.

c. 200 mls of the tankhouse electrolyte from Copper Refineries Pty. Ltd. containing 8 gms of Cu$^{2+}$ and 10% v/v sulphuric acid in water was treated with 50 ml of acetonitrile and 4 gms of iron powder. A little hydrogen was evolved until the iron became coated with copper, and after 2 hours the blue cupric colour had been discharged leaving a pale green cuprous and ferrous sulphate solution. This was filtered and thermally disproportionated to give 4.1 gms of copper powder, containing 30 ppm iron.

The dissolution of metal sulphates in nitrile-water mixtures depends of course on the solubility of these metal sulphates, but nickel, iron, cadmium and cobalt sulphates are all very soluble in acidified acetonitrile-water (Table 3).

d. Extraction of nickel and thermal disproportionation of the resulting cuprous solution 0.5 gms of nickel powder, −100 mesh, was shaken in a reaction vessel at room temperature with 100 ml of a suspension of 5 gms of CuSO$_4$.5H$_2$O in 25 ml of acetonitrile, 2 ml of sulphuric acid and 73 ml of water for 2 hours in a sealed vessel. The greenish solution was filtered and thermally disproportionated in a precipitation vessel to give 0.43 gms of copper. The liquor containing cupric and nickel sulphates was reconstituted with the water-acetonitrile azeotrope from the thermal disproportionation plus 2.5 gms of CuSO$_4$.5H$_2$O, and the acidity was adjusted to about 1N with sulphuric acid. A further 0.5 gms of nickel powder was oxidised in the same reaction vessel, as described above, with this composition, the solution was transferred to the precipitation vessel and then the Cu$^+$ was thermally disproportionated to give 0.40 gms of copper.

The resulting solution was cooled and cemented with nickel powder to slowly give 0.4 gm copper and a solution of NiSO$_4$ containing <200 ppm copper. The experiment was repeated with 1.0 gm of nickel matte, supplied by Western Mining Corporation to give nickel solutions and copper powder.

e. Extraction of other salts

This general procedure was repeated with 0.5 gm portions of powdered (90% minus 16 mesh) cadmium and cobalt to generate copper and solutions of CdSO$_4$ and CoSO$_4$.

Reaction 9

Cu$^{2+}$ + Ag = Cu$^+$ + Ag$^+$.

This reaction depends on having sufficient nitrile present for equilibrium to be sufficiently to the right. It appears to be slower than corresponding reaction 1. The relationships between redox potential of the couples Cu/Cu$^+$, Ag/Ag$^+$, and Cu$^{2+}$/Cu$^+$, change markedly with the proportion of acetonitrile in a water-acetonitrile mixture containing the sulphates of these ions.

Two examples of the reaction, using a preferred method follows:

a. 0.5 gm of silver powder (−100 mesh) was stirred with 2 gms of CuSO$_4$.5H$_2$O in a composition of 25 ml of acetonitrile, 25 ml of water and 3.5 ml of H$_2$SO$_4$ at 50°C. The silver dissolved within 30 minutes. Addition of copper powder rapidly cemented silver. This was washed with a solution of 5 gm CuSO$_4$.5H$_2$O in 10 ml of acetonitrile, 35 ml of water and 5 ml of H$_2$SO$_4$ to leave a residue of 0.48 gms of silver containing <1% copper.

b. An artificial mixture made up of −60 mesh samples of 0.55 gm copper, 1.0 gm lead, 1.0 gm silver, 0.36 gm antimony, 0.23 gm arsenic, 0.27 gm nickel, 1.70 gm mercury, 0.60 gm bismuth and 0.58 gm gold was shaken for one hour at room temperature with 25 gm of CuSO$_4$.5H$_2$O in 150 ml of acetonitrile, 150 ml of water and 3 ml H$_2$SO$_4$. The solution was filtered to leave a residue of 5.10 gm. The filtrate contained 0.55 gm extra copper, 0.50 gm silver, 0.18 gm nickel, and 0.024 gm bismuth. Not more than 0.005 gm of lead, antimony, mercury or gold could be detected in the filtrate.

c. 2-Hydroxycyanoethane — 0.25 gm of minus 60 mesh silver was stirred with 1.0 gm $CuSO_4.5H_2O$, 1 ml of $H_2SO_4$, 10 ml of 2-hydroxycyanoethane and 10 ml of water at 50°C for 20 minutes, after which time all the silver had dissolved. Addition of copper powder cemented 0.23 gms of silver.

Further details of reaction 9 are in Table 9.

TABLE 9

Rate of oxidation of silver and generation of cuprous sulphate 0.5 gms of minus 60 mesh silver, 2.0 gm $CuSO_4.5H_2O$, 2% $H_2SO_4$ v/v, stirred solution.

| [$CH_3CN$] ml | [$H_2O$] ml | % $Ag^+$ dissolved | |
|---|---|---|---|
| | | 12 hrs at 25°C | 20 mins 60° C |
| 15.0 | 8.0 | 60 | 76 |
| 12.5 | 10.5 | 60 | 80 |
| 10.0 | 13.0 | 50 | 55 |
| 7.5 | 15.5 | 45 | 55 |
| 5.0 | 18.0 | 18 | 20 |
| 2.5 | 20.5 | 7 | 7 |
| 0 | 23.0 | 1 | 1 |

Reaction 10.

$$Cu_2O + 2H^+ \rightarrow 2Cu^+ + H_2O$$

EXAMPLES:

a. 10 gm of cuprous oxide −16 plus 100 mesh, was shaken with a solution of 10 ml of concentrated sulphuric acid, 25 ml of acetonitrile and 65 ml of water at about 50°C in a sealed vessel for one hour. A colourless solution of $CUHSO_4$ was formed. This was filtered and found to contain 8.5 gms $Cu^+$.

b. The experiment was repeated with 30 ml of 2-hydroxycyanoethane, in place of the 25 ml of acetonitrile and 5 ml of the water, with substantially the same result.

c. A copper plate was heated in air to produce a film of black cuprous oxide. The plate was cooled and dipped into a composition of 20 ml of 2-hydroxycyanoethane, 70 ml of water and 10 ml of sulphuric acid. The black colour disappeared within one minute and a bright copper surface appeared. The solution contained cuprous ions. The plate was washed in a composition of 90 ml of water, 10 ml of 2-hydroxycyanoethane and 1 ml of sulphuric acid, then with water and dried to give a bright copper surface.

The dissolution of cuprous oxide was repeated successfully with a number of related compositions containing different proportions of sulphuric acid and acetonitrile, but always consistent with the stoichiometry of reaction 10, with a homogeneous composition, and with at least 3 moles of acetonitrile per mole of $Cu^+$ dissolved.

Reaction 11

$$Cu_2S + 2H^+ \rightarrow H_2S + 2Cu^+$$

Samples of materials containing cuprous and sulphide ions were ground to −100 mesh and 0.6 gm portions were placed in the reaction vessel, containing a condenser. The solids were suspended in 15 ml of dry acetonitrile at about 20°C and 1 ml of oleum was cautiously added with shaking. Hydrogen sulphide was evolved. A further 2 ml of concentrated sulphuric acid was slowly added and the solution was stirred for 1 hour in a very slow stream of cold dry nitrogen to sweep out the hydrogen sulphide. The solution was filtered and diluted with 50 ml of water. Cuprous sulphide was completely leached of its copper by this procedure, but attempts to perform the reaction on a larger scale failed because of polymerisation of the acetonitrile by acid at elevated temperatures and the endothermicity of reaction 11.

Reaction 12

$$3 CuO + 3SO_2 + H_2O \rightarrow CuSO_4 + 2CuHSO_3.$$
$$3 CuCO_3 + 3SO_2 + H_2O \rightarrow CuSO_4 + 2CuHSO_3 + 3CO_2.$$
$$3 Cu(OH)_2 + 3SO_2 + \rightarrow CuSO_4 + 2CuHSO_3 + 2H_2O$$

The reaction is reduction of cupric to cuprous ions by $SO_2$ in nitrile-water mixtures as in reaction 7, but is presented as a separate reaction because the basic copper salt also acts to remove excess acid produced by reduction and thus allows reduction to proceed to completion. The reaction proceeded readily at normal temperature and pressure of $SO_2$ to give cuprous salts. These were thermally disproportionated, with the modification that the residue, following slow disproportionation, was washed with sulphuric acid to convert any precipitated red $CuSO_3$ to copper and cupric sulphate.

Examples of reaction 12 and thermal disproportionation of the solution. a. When 2.5 g CuO was stirred for ½ hour at 25°C with 50 mls water saturated with $SO_2$ the black oxide dissolved and precipitated in its place red cuprous sulphite. Thus the reaction did not remove copper from other solids. The yield was 2.1 gms (95%). On washing this precipitate with 1N $H_2SO_4$, $SO_2$ was evolved and copper remained (0.6 g).

b. When 2.5 g CuO was stirred for ½ hour at 25°C with 40 mls of water, saturated with $SO_2$ and 15 mls of acetonitrile, the oxide dissolved to give a clear light green solution which could be separated from insolubles. This solution was thermally disproportionated to remove $SO_2$ and $CH_3CN$. Copper was deposited in a yield of 0.95 g (quantitative). In the presence of acetonitrile, cuprous sulphite reacts to form the soluble cuprous bisulphite and the $CuSO_4$, from the initial reaction, reacts further according to reaction 7 above.

The overall reaction of leaching and disproportionation is thought to be $$2CuO + SO_2 \rightarrow Cu + CuSO_4.$$

When the distillation step is carried out quickly, thermal disproportionation does not go to completion and a mixture of copper plus cuprous sulphite is precipitated. Washing with N $H_2SO_4$ liberates $SO_2$ from $Cu_2SO_3$ and leaves copper in a lower yield with generation of some cupric sulphate.

c. When procedure (b) was repeated with a mixture of $CuCO_3 + Cu(OH)_2$ in place of cupric oxide a similar good yield of copper was achieved.

Reaction 13

$$Cu + Ag^+ \rightarrow Cu^+ + Ag$$

One hundred mls of a solution of silver sulphate in water containing 1N sulphuric acid 25% by volume acetonitrile and assaying about 5% by weight $Ag^+$ was shaken in a sealed reaction vessel at room temperature with 3.5 grams of copper powder. Solid silver was precipitated within five minutes and the solution remained colourless. The solid was filtered off. The filtrate contained about 3% by weight copper as cuprous ions and no detectable silver. It was stored in a sealed vessel. The solid silver, containing some copper was shaken for ten minutes with 50 ml of a solution of cupric sulphate in sulphuric acid, acidified water containing 20% by volume acetonitrile and assaying about 4% cupric ion by weight, then separated by filtration, washed with water and dried. The recovered silver was 5 gms and it contained <20 ppm copper.

The experiment was repeated using silver nitrate in place of silver sulphate and 0.1 Molar nitric acid in place of sulphuric acid, with essentially the same recovery of purified silver.

Thermal Disproportion of Solutions of Cuprous Salts

Solutions of cuprous sulphate (with $CuHSO_3$ from reactions 7 and 12) in 500 mls of $H_2SO_4$ acidified mixtures of water with acetonitrile were prepared in reaction vessels by reactions 1–13 of FIG. 6, using compositions well within the preferred ranges. The solutions were centrifuged to remove all suspended solids, and about 0.1% by weight gelatin or Avitone (a sodium alkylaryl sulphonate) or ORZAN (an ammonium lignin sulphonate) were added. The solutions were transferred to a precipitation vessel and slowly distilled through an efficient column in a distillation apparatus equipped for magnetic stirring under a slow stream of nitrogen. The solutions darkened in colour to a deep blue and as the first traces of copper powder were deposited in the stirred solutions, about 0.1% by weight of good quality copper powder was added as seed. The distillation was continued slowly until all the nitrile-water azeotrope had been removed. The solid copper was separated from the blue solution by decantation and the copper powder was washed thoroughly, first with the acidified azeotrope then with warm water. The first washings and the distillate were retained. The copper powder was quickly dried. Very little oxidation was observed. Yields were >90% in all cases, based on disproportionation of the available cuprous ion and following distillation beyond the azeotrope to remove all the nitrile.

This was the general procedure, but it was modified in various ways. The following data are relevant. The yields quoted as >90% followed virtually complete removal of the acetonitrile, i.e., beyond the azeotrope.

Effect of Pressure

It is an advantage to minimise hydrolysis of acetonitrile which was fast in 10% $H_2SO_4$ at 100°C, so that distillation at 50°–60° under reduced pressure may be desirable. Table 10 gives some relevant data.

TABLE 10

Distillation of cuprous sulphate in acidified acetonitrile-water mixtures (5% $Cu^+$ by weight, 20% MeCN, 5% $H_2SO_4$ and water)[b].

| Pressure ± 10 mm | B.Pt. Azeotrope[a] |
|---|---|
| 715 | 74°C |
| 430 | 61°C |
| 365 | 56°C |
| 260 | 51°C |

(a) Azeotrope composition was 85–90% v/v acetonitrile-water. (b) Solutions precipitated copper in >90% yield.

Efficiency of Precipitation

Copper powder did not precipitate until sufficient acetonitrile had been removed to reduce the ratio of acetonitrile to $Cu^+$ to about 2.5:1. Thus acetonitrile in excess of this proportion could be removed quite rapidly without greatly influencing the thermal disproportionation. The copper recovery was almost a linear function of the volume of nitrile removed once the proportion of acetonitrile to cuprous ion was down to about 2.5:1.

In summary, a saturated solution of $Cu_2SO_4$ in 25% by volume of acetonitrile, 0.5% by volume of sulphuric acid and water, gave 70% of the available copper, when about 80% v/v of the available acetonitrile was distilled off as its azeotrope. Further removal of acetonitrile took place at higher temperatures and more copper was deposited, but removal to the point where no more azeotrope can be removed was preferred, since in most of the applications of thermal disproportionation, the cuprous ion which is not disproportionated is recycled and because high temperatures should be avoided because of hydrolysis of the nitrile.

Effect of Acid

Sulphuric acid was preferred for thermal disproportionation since acids like nitric acid oxidise copper and cuprous ions, when present at more than 0.2 molar. The amount of acid chosen, also depends on impurities in the cuprous solution. Thus copper, which was more free of arsenic, iron, antimony, and bismuth, was obtained when thermal disproportionation was from solutions >2% in sulphuric acid by volume, than from slutions <1% $H_2SO_4$ by volume. Copper arsenates were formed if the acidity decreased in solutions containing copper and arsenic. In general, solutions containing 1–2% by volume sulphuric acid were thermally disproportionated, but this depends on impurities.

Efficiency of the distillation

An efficient column was essential. With only a still head, the temperature of the distillate rose quite rapidly to 90°C and it consequently contained a smaller proportion of acetonitrile, when a $Cu_2SO_4$, $CH_3CN$, $H_2SO_4$, $H_2O$ composition was thermally disproportionated.

Quality of the copper

The copper produced was usually a course "sandy" powder, although plates were formed sometimes at the gas-liquid interface. It was easy to wash and did not appear to oxidise very readily. The presence of copper seeds just prior to disproportionation gave an improved fine discrete powder. Other additives (about 0.1% by weight) had a pronounced effect on the quality of the powder. Thus thiourea, manganous sulphate, and ferrous sulphate gave coagulated deposits, sodium thiosulphate gave a coarse powder, and gelatin, ORZAN (ammonium lignin sulphonate) and AVITONE (sodium alkylaryl sulphonates) i.e., commercial "copper" refining additives, gave excellent quality, discrete powders of high purity.

Purity of Copper

Cuprous solutions in acetonitrile-water mixtures were prepared by reaction 1 using AR copper sulphate. They contained a variety of other salts in solution and were thermally disproportionated by the general method to give copper powder which was very much purer than the starting material containing copper. Analyses are in Table 1. Most of the other salts remained in solution. Contamination was most serious with arsenic, antimony, silver, tin, and iron, but more As, Sb and Fe but less silver remained effectively in solution if disproportionation was from solutions containing more than 2% by volume $H_2SO_4$.

Solution of cuprous sulphate, 3% $Cu^+$ by weight, 1.5% $H_2SO_4$ by volume, 30% acetonitrile and 68.5% water by volume were contaminated by adding the impurities shown. The solutions were filtered and thermally disproportionated by the general procedure. The precipitated copper was analysed to give the results shown in Table 11.

Silver in the cuprous solution was removed prior to disproportionation by cementing with copper. Tin dissolved apparently as stannous salts and was apparently oxidised during disproportionation to insoluble stannic salts, because a white solid containing tin precipitated with the copper. A second dissolution of this contaminated copper by reaction 1 and thermal disproportionation gave copper with considerably less tin in it. If solutions containing stannous salts were refluxed with cupric sulphate a white solid containing tin was formed. This was filtered off prior to disproportionation to give copper which was substantially free of tin.

TABLE 11

| Additive | ppm of $Cu^{+d}$ | ppm $Cu^{c,e}$ |
|---|---|---|
| $FeSO_4$ | 600,000 | 120 |
| $NiSO_4$ | 600,000 | 140 |
| $Sb_2O_3$ | 6,000 | 360 |
| $AgNO_3{}^a$ | 60,000$^a$ | 8 |
| $PbNO_3$ | 60,000$^b$ | 12 |

(a) The solution was treated with copper powder to cement silver before thermal disproportionation. (b) Lead sulphate was filtered off. (c) By analysis of copper after thermal disproportionation. (d) Parts of the metal additive per million parts of copper detected in the solution, following addition of the salt. (e) Parts of the metal additive per million parts of copper, detected in the copper produced by thermal disproportionation.

Effect of Cuprous salts

Thermal disproportionation of $Cu_2SO_4$ or $CuHSO_4$ was most common and proceeded as described. Solutions of cuprous nitrate containing 0.75% of nitric acid and prepared by treating 4 gm of copper powder with 10 gm of cupric nitrate in 150 ml of 30% v/v acetonitrile-water under the conditions of reaction 1 gave 2.9 gms of copper when thermally disproportionated. Some dissolution of copper powder by nitric acid in reaction 1 accounts for the 110% yield.

500 ml of solutions of cuprous bisulphite, containing sulphurous acid and prepared by reaction 12 in 25% acetonitrile-water mixtures and assaying 2–4% cuprous ion, were very slowly thermally disproportionated until 200 ml had been distilled. A little $Cu_2SO_3$ was precipitated as well as copper, but upon washing with 1 Normal aqueous $H_2SO_4$ this was disproportionated to copper and cupric sulphate. The yield of copper was >85% based on the cuprous ion disproportionation.

Effect of Nitriles

A composition of 25% acetonitrile containing 20% by volume acrylonitrile, water, 2% sulphuric acid and cuprous sulphate containing 4% $Cu^+$, by weight was thermally disproportionated. The yield of copper was >90% based on disproportionation of $Cu^+$. In another experiment, 10 gm of atomised blister copper (—100 mesh) was stirred with 35 g of $CuSO_4.5H_2O$ in 500 ml of solution containing 30% acrylonitrile, 30% ethanol, 35% water and 5% $H_2SO_4$ all on a volume basis. The colour was discharged after one hour, the solution was filtered and thermally disproportionated to to remove acrylonitrile at 69°–71°C. 9 gm of copper was precipitated containing 30 ppm lead, 14 ppm silver, <30 ppm selenium and <1 ppm nickel. The blister copper contained 10 times this level of impurities before treatment.

Effect of oxygen

Air was bubbled through a solution initially of 10% by weight $Cu_2SO_4$ in acidified 25% acetonitrile-water during thermal disproportionation. The yield of copper was reduced to 30%, based on disproportionation of $Cu^+$.

Effect of Cupric sulphate

Solutions which were high in acetonitrile (e.g. 50% by volume) and cuprous sulphate (e.g. 14% $Cu^+$ by weight) sometimes precipitated cupric sulphate with the copper after thermal disproportionation and cooling. In such cases, the solids were washed with hot water to remove cupric sulphate.

A number of copper powder refining and cuprous winning experiments on 500 ml solutions of about 10% $Cu_2SO_4$ by weight, 20–25% acetonitrile; water and 1–2% $H_2SO_4$ by volume are summarized below.

Copper Powder Refining

The general procedure for thermal disproportionation of a solution prepared by reaction 1 was followed in a precipitation vessel and then the solution, following removal of the acetonitrile-water azeotrope, was removed to a reaction vessel with a peristaltic pump and recombined with the azeotrope, maintaining a sealed system at 50°–60°C under nitrogen. The acidity was checked and a little $H_2SO_4$ was added to return it to 0.5 Normal. This solution was mixed with an excess (30 gms) of finely divided (—16 plus 100 mesh) blister copper as specified for reaction 1 and the resulting cuprous sulphate solution was filtered from the reaction vessel. About 1 mg of glue was added, and the thermal disproportionation was repeated in the precipitation vessel containing the previous copper powder. The cycle was repeated three times with no significant change in the yield or purity of the resulting copper powder. The equipment used was arranged in a way based on part of FIG. 5, using a peristaltic pump to transfer solutions from reaction vessel to precipitation vessel.

Cuprous winning

The general procedure for thermal disproportionation was followed on solutions of known $Cu^+$ concentration. The solution, following removal of the acetonitrile-water azeotrope, was removed from the precipitation vessel and recombined with one half of the azeotrope in a reaction vessel, maintaining a sealed system under nitrogen. This solution was treated with about 7 gms (i.e., 0.25 mole of iron powder per mole of $Cu^+$ in the original solution) in the reaction vessel under the conditions of reaction 8. The resulting cuprous plus ferrous sulphate solution was filtered, acid was added to maintain >1N acid and the solution was thermally disproportionated in the precipitation vessel containing the original precipitated copper. The cycle was repeated, this time with 3.5 gms (i.e., 0.13 mole of iron powder per mole of $Cu^+$ in the original solution) using the same reaction vessel for reaction 8 and the same precipitation vessel for thermal disproportionation. About 80% of the available copper was recovered in this way.

Electrochemical Disproportionation of Solutions of Cuprous Salts

Solutions of cuprous sulphate in 500 ml of sulphuric acid, water and acetonitrile or 2-hydroxycyanoethane were prepared by reactions 1–13 using compositions well within the specified ranges and containing 2–5% by weight cuprous ion. The solutions were centrifuged to remove suspended solids and if necessary, the concentration of sulphuric acid was increased to 1.5–3 Normal. About 0.001% by weight of gelatin was added to those solutions in which cathode quality was examined. These almost colourless solutions were placed in a rectangular glass vessel equipped with 4 inch × 4 inch copper cathodes between 4 inch × 4 inch inert anodes of platinum, dense graphite, graphite cloth or graphite felt at a separation of 1 inch. The solutions were stirred by circulation with a peristaltic pump and the cell was covered with a film of Glad$^R$ Wrap plastic sheet under which nitrogen was very slowly circulated. The solutions were electrolysed at a current density of 5–40 amps/sq. foot and copper was deposited at the cathode. No gases were evolved at the anode. The temperature varied between 20°–60°C.

The solutions gradually darkened in their blue colour, the voltage rose and the efficiency calculated on the basis of a one electron process, dropped slowly from 98% to about 50%. The process was not continued beyond 20% recovery of the copper available by disproportionation.

Copper Powder Electrorefining

The experiment was performed as described above, except that the peristaltic pump was used to circulate the anolyte through a sealed reaction vessel in which the anolyte was stirred with an excess of −16 + 100 mesh of materials containing >90% copper, such as atomised blister copper, or copper powder from thermal disproportionation. Further traces of glue were added from time to time if cathode quality was being tested. The circulation and current density were adjusted such that the electrolyte emerging from the reaction vessel was very pale blue and it was passed through a glass wool filter before returning to the cell. If the copper was too fine it tended to carry over into the cell, e.g. cement copper. The process was continued for periods of up to 4 days and good quality, dense, very fine grained copper cathodes were obtained with efficiencies >90%. Some of these were analysed with the results shown in Table 1, i.e., marked purification of copper, relative to the copper feed.

Cuprous electrowinning

The electrochemical disproportionation was performed in the general way described, and as for copper powder electrorefining except that the peristaltic pump circulated the anolyte through a sealed reaction vessel containing a stirred quantity of iron powder which was 10–20% by weight of the total cuprous ion in the electrolyte. The iron immediately cemented copper from the cuprous solution and this acted as the reductant for the cupric ion in the anolyte. When the cemented copper powder in the reaction vessel had decreased to about 10% of the original volume, a further quantity of iron powder was added, such that it was 10–20% by weight of the cuprous ion in the electrolyte at that stage of the process. These steps were repeated until the quantity of cuprous ion in the electrolyte was so low (e.g. 0.5% at 20 amps/sq. ft) as to lead to gas evolution and rises in voltage at the current density and stirring speed of operation. Good quality cathodes were obtained at efficiencies >85% based on a one electron process. The cathodes contained <10 ppm iron and were at least an order of magnitude lower in impurities than the material used to prepare the cuprous solutions as shown partly in Table 1.

The above descriptions describe our preferred general procedure for electrochemical disproportionation, copper powder electrorefining and cuprous electrowinning. The following Tables summarise some of the data showing the effect of different variables on cell voltage, on efficiency and in some cases on cathode quality. For some of the experiments, copper powder electrorefining was performed using deep beakers with the electrodes immersed in them to a shallow depth, with copper of about -16 mesh well stirred at the bottom of the beaker. There were no additives. Although most of the data are for copper powder electrorefining it was found that the effect of different variables was similar for the other forms of electrochemical disproportionation, when tested. It was difficult to reproduce efficiency of stirring, so that not all the results are consistent, except within each set of experiments.

Effect of Temperature

The cell voltage increased from about 500 mv to above 800 mv as the temperature was lowered from 45° to 20°C. The electrolyte was 200 ml of cuprous sulphate assaying 4% $Cu^+$, in 25% v/v acetonitrile, 5% v/v $H_2SO_4$, and water. The anode was platinum, the current density was 45 amps/sq. ft. on 10 cm$^2$ electrodes in Glad$^R$ wrap-covered, well stirred solutions under nitrogen. The cathodic deposit was always noticeably denser and smoother at 20°C than at 50°C. An operating temperature of 30°–40°C was chosen as the most desirable.

Effect of Acid.

As expected, voltages increased as the proportion of sulphuric acid decreased from 7% by volume. Solutions containing 10% $H_2SO_4$ evolved a little gas at the cathode and the quality of the cathode deteriorated as the acid concentration increased.

Effect of Nitrile Concentration

The effect of varying the concentration of acetonitrile on the voltage of a copper powder electrorefining experiment at 33°C, using the composition and conditions specified for temperature variation, but varying the concentration of acetonitrile, is shown in Table 12. Two factors are important, the resistance of the electrolyte, which increases with increasing proportion of nitrile and the ease of disproportionation, which increases with a lower proportion of nitrile to $Cu^+$.

The cathode quality the voltage and the efficiency increased with increasing proportion of nitrile. The solutions remained blue, when the proportion of acetonitrile was <3 moles:1 of $Cu^+$. The efficiency for low proportions of acetonitrile was <90%. Electrochemical disproportionation proceeded at very low voltages when the proportion of nitrile to $Cu^+$ was about 3:1, but copper powder electrorefining was not completely satisfactory, we think because of slow reaction 1 and relatively fast oxidation. Thus about 6 moles:1 was preferred.

Effect of oxygen and evaporation

A copper powder electro-refining experiment, using the conditions and electrolyte specified for effect of temperature, was performed in an open cell. It operated satisfactorily for eight hours, but then voltage rose and the efficiency dropped to 50%. The acidity was markedly less than the initial value.

Effect of current density

In a well stirred solution, 500 ml of cuprous sulphate assaying 3% $Cu^+$ by weight, 5% $H_2SO_4$ by volume, water, and 15% by volume acetonitrile at 23°±2°C electrolysed with 1 inch between a 20 $cm^2$ platinum anode and copper cathode with no additives gave voltages at the current densities shown in Table 13. The cathodic deposit deteriorated as the current density increased, but the deposit was still adherent at 40 amps/sq. ft.

Effect of Ferrous sulphate.

The electrolyte described immediately above was contaminated with 25 gm of ferrous sulphate (5%) and electrolysed as described at a current density of 20 amps/sq. ft. The cathode was of similar quality, the efficiency was 91–93% and the voltage was only marginally higher than in the absence of ferrous sulphate. The cathode contained 10 ppm of iron.

TABLE 12

Effect of nitrile proportion on cell voltage in Electrochemical Disproportionation at 20°–22°C in stirred solutions, dense graphite anote, copper cathode separated by 1 inch. Electrolyte: 3% $Cu^+$ by weight, 5% $H_2SO_4$ v/v, water and either 15% (6 moles:1 $Cu^+$) or 25% (10 moles:1 $Cu^+$) acetonitrile by volume

| current density amps/sq ft. | 25% MeCN[a] (volts) | 15% MeCN (volts) |
|---|---|---|
| 5 | 0.50 | 0.34 |
| 10 | 0.66 | 0.45 |
| 15 | 0.81 | 0.54 |

[a]Cathode was of better quality than from 15% MeCN.

Effect of Anodes and stirring on Voltage

An electrolyte of cuprous sulphate assaying 3% $Cu^+$ by weight, 5% sulphuric acid, 15% v/v acetonitrile (i.e., 6 moles : 1 mole $Cu^+$) and water was electrolysed in stirred and unstirred solution at various current densities at 20°–22°C with various anodes about 20 $cm^2$ in area about 1 inch from a copper cathode. The voltages are shown in Tables 13 and 15. In another experiment, an electrolyte of 3% $Cu^+$, 28% v/v MeCN, 5% $H_2SO_4$ and water was electrolysed at 42° and 15 amps/sq. ft. with various anodes of equal areas and a copper cathode in well stirred solutions. The voltages were: stainless steel, 0.95 volt; gold plated steel, 0.85 volt; platinum, 0.65 volt; dense graphite, 0.78 volt. Even lower voltages than those shown in Table 13 were obtained with more vigorously stirred solutions in beakers.

Use of 2-hydroxycyanoethane

Two litres of an electrolyte containing 3% weight $Cu^+$, 19% 2-hydroxycyanoethane by volume, 5% $H_2SO_4$ by volume and water, plus about 0.1% by weight of glue, thiourea and AVITONE, was electrolysed at 30°C with a copper cathode between a platinum and a dense graphite anode respectively at a separation of 1 inch. The anode and cathode areas were 12 sq. ins. The soluttion was stirred by a peristaltic pump which passed the electrolyte through a tower containing copper powder. The current density was 9 amps/sq. ft. The cell operated at 0.60 volts for 12 hours at >95% efficiency for deposition of copper by a one electron process. The cell was covered with Glad wrap and operated under nitrogen. The cathode deposit was dense and fine grained and contained <10 ppm of Fe, Ni, Pb, or Sn.

Use of Acetonitrile

One litre of an electrolyte containing 4% by weight of $Cu^+$, 20% by volume acetonitrile, 5% $H_2SO_4$ by volume, water, and 0.1% of glue, prepared from blister copper and cupric sulphate by reaction (1), was electrolysed at 25°C with a copper cathode between two dense graphite anodes each 40 $cm^2$, separated by 4 cm at a current density of 15.5 amps/sq. ft. The anolyte was circulated over 15 gm of −16 mesh blister copper in a reaction vessel with stirring, and returned to the cell. The cell was covered with Glad wrap and was under nitrogen. The cell operated at 0.70 volts over 6 hours with an efficiency of 95% for copper deposited by a one electron process. The cathode was dense and fine grained and contained <10 ppm of Fe, Ni, Pb or Sn.

TABLE 13

Effect of Different Anodes and Stirring on Cell Voltage in Electrochemical Disproportionation at 20°–22°C.

Electrolyte: 3% $Cu^+$ by weight, 5% $H_2SO_4$ v/v, 15% MeCN and water.

Electrodes 20 $cm^2$ separated by 1 inch, copper cathode.

| current density amps/ sq ft. | Cell Voltage (volts). Anodes | | | | | | | |
|---|---|---|---|---|---|---|---|---|
| | dense carbon | | carbon felt | | platinum | | stainless steel | |
| | S[a] | U[a] | S | U | S | U | S | U |
| 5 | 0.34 | 0.39 | 0.46 | 0.50 | 0.38 | 0.45 | 0.82 | 0.76 |
| 10 | 0.45 | 0.54 | 0.62 | 0.68 | 0.49 | 0.56 | 1.02 | 1.08 |
| 15 | 0.54 | 0.70 | 0.74 | 0.85 | 0.57 | 0.69 | 1.12 | 1.24 |
| 20 | 0.64 | 0.91 | 0.86 | 1.00 | 0.67 | — | 1.22 | 1.4 |
| 25 | 0.72 | 1.28 | 0.98 | 1.06 | 0.75 | — | 1.31 | |
| 30 | 0.82 | 1.4 | 1.09 | 1.4 | 0.85 | — | | |
| 40 | 1.03 | 1.4 | 1.36 | 1.4 | 1.06 | | | |

[a] S is a stirred solution, U is an unstirred solution.

Effect of the Nature of the Nitrile on Voltage

Identical copper powder electrorefining experiments were performed with the same molar proportion of acetonitrile and 2-hydroxycyanoethane. The cell voltage was higher with 2-hydroxycyanoethane, no doubt because of the greater resistance of the solution. Data are in Table 14. Table 14 also shows the effect of current density and of platinum versus dense graphite anodes. The voltage varied with the rate of stirring.

TABLE 14

Voltage of Electrochemical Disproportionation of Cuprous Solutions.

Composition: $Cu^+$ 3% by weight, $H_2SO_4$, 5% by volume, water, 15% acetonitrile (6 moles:1 $Cu^+$) or 19% 2-hydroxycyanoethane (6 moles:1 $Cu^+$) at 20°–22°C.

Electrode separation 1 inch, electrodes 20 cm² in area, well stirred solutions.

| Current density amps/ sq ft. | cell voltage (volts) | | | |
|---|---|---|---|---|
| | Dense graphite anode | | Pt. Anode | |
| | 19% OHCH$_2$CH$_2$CN | 15% CH$_3$CN | 19% OHCH$_2$CH$_2$CN | 15% CH$_3$CN |
| | volts | volts | volts | volts |
| 5 | 0.41 | 0.34 | 0.41 | 0.38 |
| 10 | 0.57 | 0.45 | 0.53 | 0.49 |
| 15 | 0.72 | 0.54 | 0.64 | 0.57 |
| 20 | 0.90 | 0.64 | 0.77 | 0.67 |
| 25 | 1.12 | 0.72 | 0.96 | 0.75 |
| 30 | 1.38 | 0.82 | — | 0.85 |
| 40 | — | 1.03 | — | 1.06 |

TABLE 15

Effect of number of electrodes in cell voltage at 20°–22°.

Electrolyte 3% $Cu^+$, 5% $H_2SO_4$, 25% acetonitrile, water.

Dense graphite anodes, copper cathodes.

Separation 1 inch. Electrodes connected in parallel. Stirred solutions.

| Current Density amps/sq ft. | C Cu C | C Cu C | C Cu C Cu C | C Cu C Cu C Cu C |
|---|---|---|---|---|
| | volts | volts | volts | volts |
| 5.7 | 0.53 | 0.57 | 0.59 | 0.62 |
| 7.8 | 0.58 | 0.64 | 0.67 | 0.70 |

-continued

| Current Density amps/sq ft. | C Cu C | C Cu C | C Cu C Cu C | C Cu C Cu C Cu C |
|---|---|---|---|---|
| | volts | volts | volts | volts |
| 9.7 | 0.64 | 0.72 | 0.76 | 0.80 |
| 11.6 | 0.70 | 0.81 | 0.86 | 0.91 |
| 15.5 | 0.83 | 1.02 | 1.11 | — |

It is to be understood that the foregoing detailed description is given merely by way of illustration and that many variations may be made therein, without departing from the spirit of this invention.

We claim:

1. A method of reducing an aqueous cupric sulfate solution to a solution containing cuprous sulfite, cuprous bisulfite or mixtures thereof comprising mixing said aqueous cupric sulfate solution with between 5 and 30% acetonitrile, adding sulfur dioxide and maintaining the pH of the cupric sulfate solution between 1 and 6 until a solution containing cuprous sulfite, cuprous bisulfite or mixtures thereof is formed.

2. The method of claim 1 and further comprising adding a base to the cupric sulfate solution to maintain said pH between 1 and 6.

3. A method of leaching copper values as a solution containing cuprous sulfate, cuprous bisulfite or mixtures thereof from a material selected from the group consisting of copper oxides, copper carbonates and copper hydroxides comprising mixing said material in a leaching vesel under an atmosphere of sulphur dioxide with a homogeneous composition containing aqueous cupric sulfate assaying at least 0.05% cupric ion by weight, 5 to 30% by volume of acetonitrile, and at least 50% by volume water, allowing the mixture to react, separating unreacted solids from the mixture and recovering the resulting solution containing cuprous sulfate, cuprous, bisulfite or mixtures thereof.

* * * * *